United States Patent
Garcia De La Pena

(10) Patent No.: US 11,808,250 B2
(45) Date of Patent: Nov. 7, 2023

(54) METHOD AND EQUIPMENT FOR REPLACING WIND TURBINE COMPONENTS

(71) Applicant: LEUNAMME ENGINEERING S.L.U., Navarra (ES)

(72) Inventor: Emmanuel Garcia De La Pena, Navarra (ES)

(73) Assignee: LEUNAMME ENGINEERING S.L.U., Navarra (ES)

( * ) Notice: Subject to any disclaimer, the term of this patent is extended or adjusted under 35 U.S.C. 154(b) by 298 days.

(21) Appl. No.: 16/335,950

(22) PCT Filed: Sep. 23, 2016

(86) PCT No.: PCT/ES2016/070669
§ 371 (c)(1),
(2) Date: Mar. 22, 2019

(87) PCT Pub. No.: WO2018/055217
PCT Pub. Date: Mar. 29, 2018

(65) Prior Publication Data
US 2019/0219035 A1    Jul. 18, 2019

(51) Int. Cl.
*F03D 80/50* (2016.01)

(52) U.S. Cl.
CPC .......... *F03D 80/50* (2016.05); *F05B 2230/61* (2013.01); *Y02E 10/72* (2013.01)

(58) Field of Classification Search
CPC .......... F03D 13/10; F03D 13/20; F03D 80/50; F03D 80/55; F05B 2230/61; F05B 2240/912; F05B 2240/913; F05B 2240/916
See application file for complete search history.

(56) References Cited

U.S. PATENT DOCUMENTS

| | | | |
|---|---|---|---|
| 4,793,439 A * | 12/1988 | Crawford | B66F 1/025 182/136 |
| 4,893,512 A * | 1/1990 | Tanimoto | F22B 37/006 73/622 |
| 8,201,787 B2 * | 6/2012 | Ingram | F03D 13/20 248/218.4 |

(Continued)

FOREIGN PATENT DOCUMENTS

| CN | 104743451 A | 7/2015 | |
|---|---|---|---|
| CN | 106043483 B * | 5/2018 | ........... B62D 57/024 |

(Continued)

OTHER PUBLICATIONS

International Search Report and Written Opinion for Corresponding international Application No. PCT/ES2016/070669 (10 Pages) (dated Jun. 21, 2017).

*Primary Examiner* — Jacob J Cigna
(74) *Attorney, Agent, or Firm* — Lucas & Mercanti, LLP

(57) ABSTRACT

Method and equipment for replacing wind turbine components, by means of a telescopic structure which is attached, in a vertical and retracted position, to the base of the wind turbine tower and which can be extended and moved upwards until it reaches the tower head, by means of collars and webbings mounted around the tower and being fixed thereto. The components to be replaced are raised and lowered by means of the telescopic structure.

18 Claims, 28 Drawing Sheets

(56) References Cited

U.S. PATENT DOCUMENTS

| | | | | |
|---|---|---|---|---|
| 8,601,748 B2* | 12/2013 | Delago | ................ | E04H 12/342 |
| | | | | 52/123.1 |
| 9,327,784 B2* | 5/2016 | Bagheri | ................ | E04G 3/28 |
| 10,494,235 B2* | 12/2019 | Nelson | ................ | B66C 23/207 |
| 10,590,745 B2* | 3/2020 | Munro | ................ | B63C 11/52 |
| 10,843,907 B2* | 11/2020 | Lagerweij | ................ | B66C 23/54 |
| 2008/0203246 A1* | 8/2008 | Ingram | ................ | F03D 80/55 |
| | | | | 248/74.1 |
| 2010/0005656 A1 | 1/2010 | Vangsy | | |
| 2011/0094987 A1* | 4/2011 | Botwright | ................ | B66C 23/185 |
| | | | | 212/274 |
| 2011/0168654 A1 | 7/2011 | Ahler et al. | | |
| 2012/0003089 A1* | 1/2012 | Byreddy | ................ | B08B 1/008 |
| | | | | 416/61 |
| 2012/0131880 A1* | 5/2012 | Delago | ................ | F03D 13/10 |
| | | | | 52/745.18 |
| 2012/0258252 A1* | 10/2012 | Jensen | ................ | B66D 3/18 |
| | | | | 427/427.1 |
| 2013/0228397 A1* | 9/2013 | Horn | ................ | E04G 3/243 |
| | | | | 182/141 |
| 2014/0010658 A1 | 1/2014 | Nielsen | | |
| 2015/0090504 A1* | 4/2015 | Bagheri | ................ | F03D 80/50 |
| | | | | 180/7.1 |
| 2015/0110638 A1 | 4/2015 | Rose, Jr. et al. | | |
| 2015/0232307 A1 | 8/2015 | Holloway et al. | | |
| 2019/0338757 A1* | 11/2019 | Helmens | ................ | F03D 13/40 |

FOREIGN PATENT DOCUMENTS

| | | | | | |
|---|---|---|---|---|---|
| CN | 108161920 A | * | 6/2018 | | |
| CN | 108555940 A | * | 9/2018 | ............ | B25J 11/00 |
| CN | 111301547 A | * | 6/2020 | | |
| DE | 19741988 A1 | | 4/1999 | ............ | B66C 23/207 |
| EP | 2369174 A1 | | 9/2011 | | |
| EP | 2908000 A2 | * | 8/2015 | ............ | B66C 23/207 |
| EP | 2908000 A2 | | 8/2015 | | |
| ES | 2283884 T3 | | 11/2007 | | |
| JP | 2008094628 A | * | 4/2008 | ............ | B66C 23/185 |

\* cited by examiner

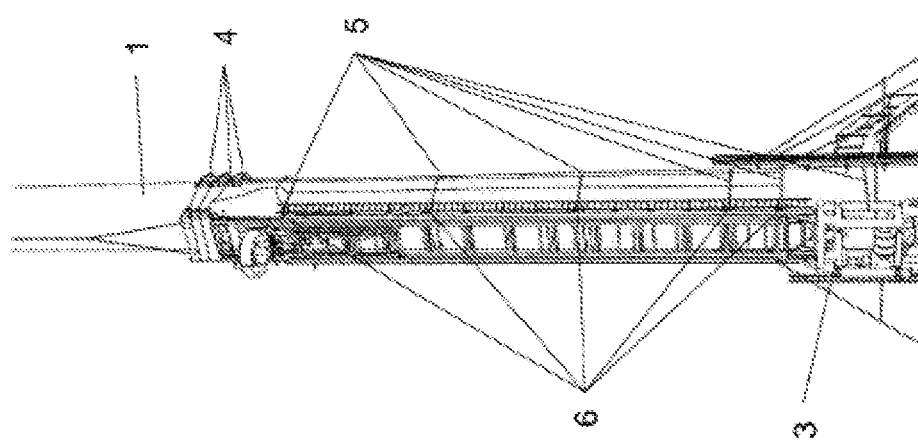

METHOD AND EQUIPMENT FOR REPLACING WIND TURBINE COMPONENTS

CROSS REFERENCE TO RELATED APPLICATION

This Application is a 371 of PCT/ES2016/070669 filed on Sep. 23, 2016 which is incorporated herein by reference.

FIELD OF THE INVENTION

The present invention relates to a method and equipment for replacing wind turbine components, both internal components, situated inside the tower head (nacelle or hub), and external ones, situated outside the tower head, especially the blades of the wind turbine.

BACKGROUND OF THE INVENTION

In order to replace wind turbine components, the use of cranes is known by means of which the lowering and hoisting of the component to be replaced is performed. Due to the heavy weight of certain components and the height of the towers of the wind turbines, high-tonnage cranes are necessary, the installation of which implies a high cost.

For the reason explained and for the problems that may be caused by the wind, currently craneless solutions are being worked with, by means of systems based on the use of suspension cables. Among the systems based on the use of cables, the following prior art can be cited: US2015232307, US20100005656, US20140010658, ES2283884, EP2369174, CN2023971U and US2015110638.

The systems described in the aforementioned prior art, although the installation thereof implies much lower costs than crane installations, have the same problems because of the wind, which makes it so certain companies do not allow the use thereof for safety reasons.

Furthermore, the solutions based on the use of cables tend to be specific for a certain model of wind turbine and require specific tools as well.

In most cases, the use of cables requires adapting the head of the wind turbine in order to be able to install a crane from which the cable is suspended and handled.

Document EP12759492.7 shows a lifting device for the assembly and disassembly of wind turbine components, specifically the blades of the turbine, which improves the previous methods, but it has problems, such as for example, how to secure the upper hook to the root of the blade through the housing of the casing of the hub, and several disadvantages for lowering the blade, due to the large movement generated on the tower during the direct folding of the device with the centre of gravity of the blade so far away from the tower. In this lifting device, the folding of the structure is done directly from the vertical position to the horizontal position, causing large torques and stresses on the different sections of the structure.

Furthermore, in the joining of the device to the tower of the wind turbine, this device uses arms with wheels, which is extremely inefficient due to logistical restrictions: such arms would need to be enormous, which would lead to an assembly in the field in order to build the arms with the necessary size.

In terms of logistical restrictions, the device cannot be built on the blade during the transportation thereof, for which reason this makes the device shown in EP12759492.7 not viable to be transported together with the blade, making it less cost efficient.

DESCRIPTION OF THE INVENTION

The object of the present invention is to eliminate the explained problems by means of a method and equipment which enable carrying out the replacement of wind turbine components in a safer manner, which is not affected by the effects of wind, and wherein the installation of the necessary equipment can be performed in a simple manner and without requiring expensive auxiliary elements.

The method of the invention is based on the use of a telescopic structure, made up of at least two segments, which is designed to be attached in the vertical position and collected at the lower portion of the tower, and lifted until it reaches the head of said tower. This telescopic structure will act as means through which the tower components to be replaced are lowered and raised.

The method of the invention starts with the telescopic structure and the components to be replaced being brought closer to the base of the tower.

A series of horizontal collars are constructed around the base of the tower, which can be moved along the tower and which ensure that the structure is always close to the tower by means of the fitting of the length thereof.

Each collar is fastened to a mobile segment of the telescopic structure, preferably on the upper end of said segment, except for the two-segment variant as explained later on.

A series of webbings is also arranged around the base of the tower, underneath the lower collar. The webbings are successively suspended between each other and the set of webbings is suspended from the lower collar. As the telescopic structure is lifted, each webbing is placed at the height of the corresponding anchor thereof made up of adjustable tension rods in the lower segment of the telescopic structure.

Next, the telescopic structure is then attached, collected and in the vertical position, on the tower, to which the lower segment is fastened by means of the series of webbings, with adjustable tension rods.

Then the webbings are released from the lower collar and the unfolding or the lifting is started with the telescopic structure until it reaches the tower head.

The unfolding of the telescopic structure is carried out with the collar of each mobile segment fastened to the upper end of said mobile segment. It continues in this manner until it reaches the tower head. The raising and lowering of the components to be replaced is carried out by means of or through the telescopic structure, which will be explained later on.

According to a preferred embodiment, the telescopic structure is made up of only two segments which are kept attached to the tower through at least as many other collars, one or more fastened to the upper end of a segment of the telescopic structure and the other or more to the lower end of the second segment. These two segments are fastened onto the tower by means of at least other webbings. The two segments of the telescopic structure are mounted on each other through guides which enable the relative sliding thereof and are further connected through a longitudinal linear actuator, made up for example of a hydraulic cylinder, the activation of which in one direction or another is achieved in the alternating retraction and expansion of both segments and with it and by means of the alternating fastening and releasing of the webbings attached to said segments of the tower, the raising or lowering of the telescopic structure.

According to a possible variation of installation, fastened on the tower, at a height above the length of the collected structure, is an auxiliary collar which is fitted to the perimeter of the cross section of the tower at the height where it is to be left, staying positioned at said height by the effects of the tapering thereof. From this auxiliary collar a cable or cord is suspended which is fastened to the upper end of the folded structure, wherein there is a device, such as for example a winch, which collects said cable or cord in order to proceed to hoist the folded structure until it reaches the vertical position and is attached to the base of the tower before the unfolding thereof.

The installation of the telescopic structure could also be performed by an auxiliary crane.

When the components to be replaced are components inside the head of the tower, fundamentally in the nacelle, a crane with a platform is incorporated in the upper end of the telescopic head, once said structure has reached the tower head, the crane extracts the component from the nacelle or the hub and deposits it on the platform, and it is on said platform where the lowering and raising of said components is safely carried out.

When replacing a blade of the wind turbine, the lowering thereof is carried out in the following manner:

The blade to be replaced is placed in the vertical position, with the tip pointing downwards. A cover is coupled onto the blade to be replaced starting from the tip. To do so, the cover is suspended, from the mouth thereof, from the upper segment of the telescopic structure and is pulled from said telescopic structure, once it is facing the tip of the blade. In the upper segment of the telescopic structure a gripper is mounted with which, when said structure is raised until it reaches the tower head, it tightly clasps the blade, around the root. With this, the blade is secured by means of the cover and the gripper. Then the blade of the hub is released and lowered until it rests on the gripper, through the bearing. The blade is brought closer to the tower and is then lowered, by means of the progressive lowering of the gripper and the cover, by lowering or retracting the telescopic structure. When the tip of the blade reaches the ground or is close thereto, the blade is collapsed until it reaches an approximately horizontal position, for example, pulling horizontally from the tip of the blade, through the cover coupled onto said blade, at the same time as the root of the blade is made to descend progressively. Once the horizontal position is reached, the blade is suspended from a rocker arm, hanging from a crane, the cover is extracted, the root is freed from the gripper and finally the blade is loaded onto a transportation platform.

The release of the blade from the hub can proceed in the following manner: the blade is placed in the vertical position, with the tip pointing upwards, and a first group of nuts is extracted, leaving a second group of nuts not extracted, in a sufficient number to support the rotation of the blade to 180°, until it is situated in the vertical position with the tip pointing downwards, and also supporting the weight of said blade in this position, the blade therefore resting in the gripper, through the bearing, in order to extract the second group of nuts.

The gripper can be equipped with supports having an adjustable height for the bearing of the blade.

The mentioned supports can consist of vertical telescopic actuation cylinders, for example, hydraulic ones.

The gripper can be made up of two arched arms, coplanar and facing each other on the concave side, which are articulated on one end and by means of corresponding vertical shafts, on a first support which is mounted on the upper segment of the telescopic structure, through a fitting system.

The mentioned fitting system can be made up of a base whereon the first support is mounted, through a horizontal rotation shaft and actuation cylinders.

The base is mounted through a rail perpendicular to the aforementioned horizontal rotation shaft on a second support which is articulated to a frame, through a tilting shaft parallel to the rail.

The fitting system further includes a compass, through which the aforementioned frame is connected to the upper segment of the telescopic structure, this compass being movable along the height of said segment.

With the mentioned arrangement the gripper can be fitted to the position of the bearing of the blade which is to be replaced, against the root of the blade when it is not in the exact vertical position; finding the root of the blade, depending on the configuration of the wind turbine; collapsing and placing the blade in the horizontal position, during the lowering thereof; and further enabling the opening and closing of the arms of the gripper and of the lowering and raising along the last segment of the telescopic structure in order to be able to place the root of the blade at ground level.

The telescopic structure will be made up of straight segments equipped with longitudinal guides, through which said segments are connected, with the ability of relative movement between them.

According to a possible embodiment, the telescopic structure carries a weight which can be used as an energy accumulator, raising it with the excess energy from the wind turbine, when this occurs, and converting the potential energy thereof into electrical energy, by means of lowering the weight, when the energy demand exceeds the energy generated by the wind turbine.

As far as the carts, the collars comprise a horizontal frame, which is a carrier for horizontal shaft wheels, through which said carts will rest and roll on the tower. The frame is furthermore a carrier for an external rocker arm with vertical shaft sheaves, whereon a cable rests which becomes a part of the collars and which connects the carts to an autonomous linear actuator, for example made up of a spindle. The external rocker arm is mounted in the frame through a central horizontal tilting shaft.

BRIEF DESCRIPTION OF THE DRAWINGS

In the attached drawings a possible embodiment is shown as a non-limiting example, wherein:

FIGS. 1a to 1d show a perspective view of the different steps of the method of the invention.

DETAILED DESCRIPTION OF AN EMBODIMENT

FIGS. 1a to 1d show the process for installing and expanding the unfoldable telescopic structure in order to replace wind turbine components object of the invention.

Figure 1A:
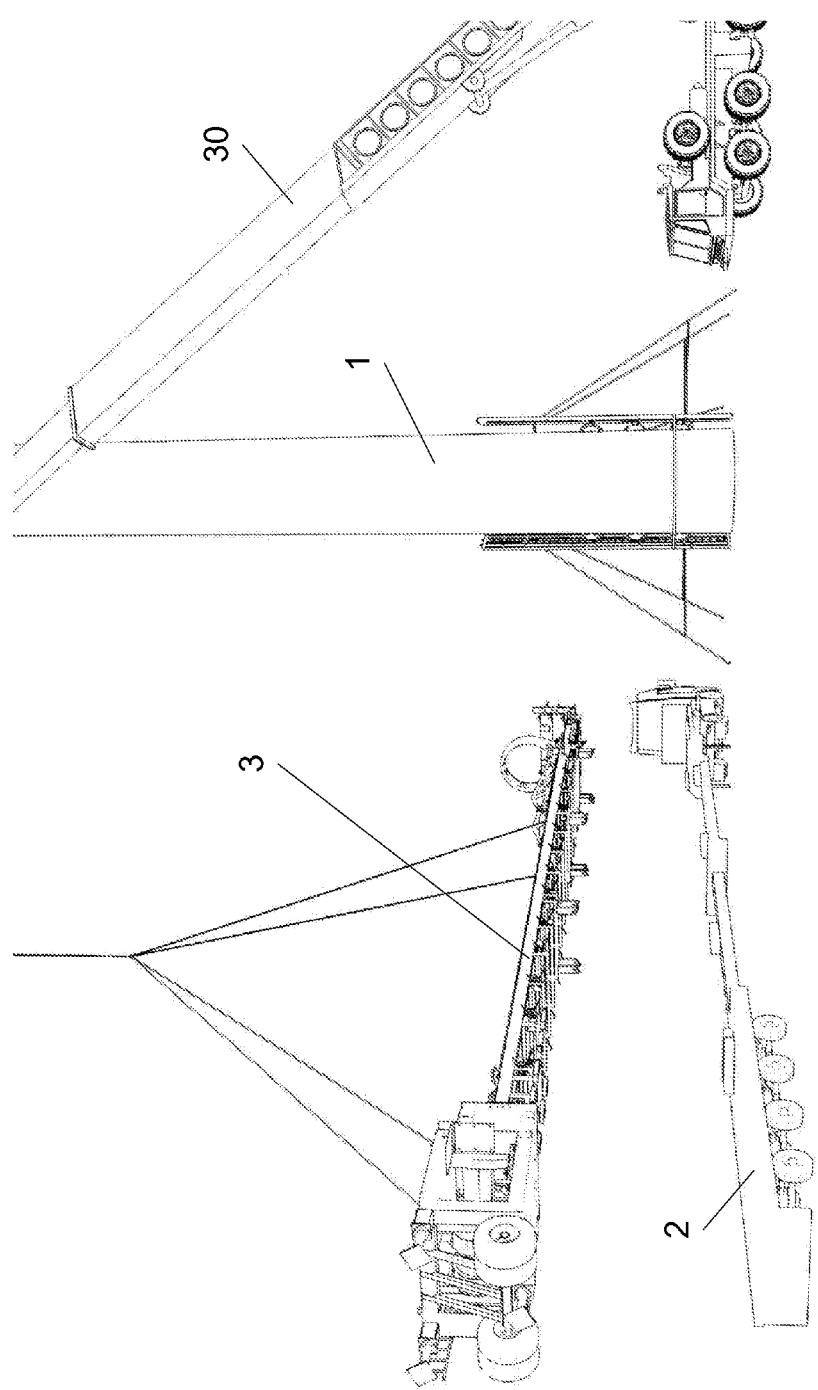
Figure 1B:
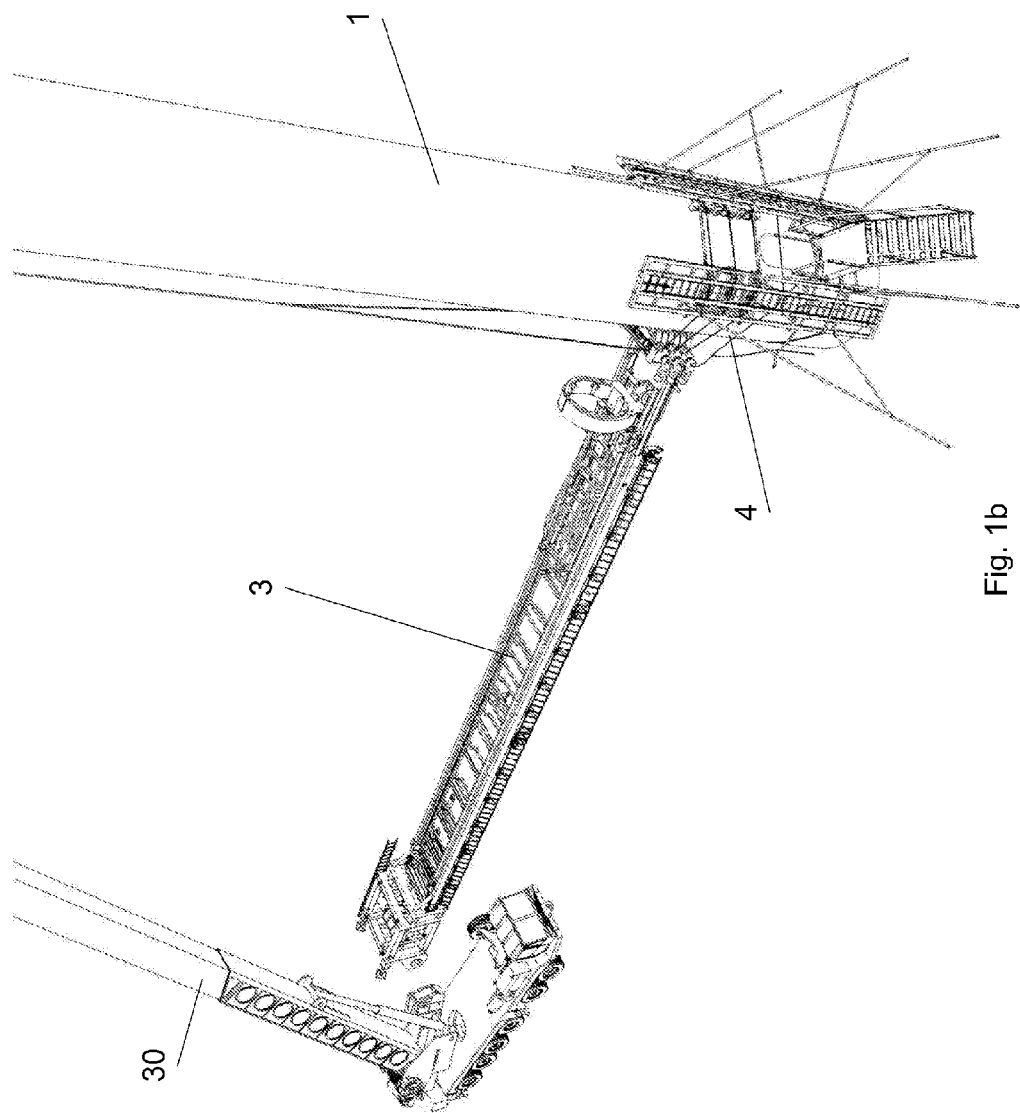

The process is started, as shown in FIG. 1a, by moving an unfolding telescopic structure (3) closer to the base of the tower (1) of a wind turbine, for example by means of a transportation platform (2), which will act as means for lowering the components to be replaced and the new components to be mounted will be raised, having also been transported to the base of the tower (1).

A series of horizontal collars (4) is installed around the base of the tower, FIG. 1.b, which are fastened to the tower by fitting the outline thereof.

A series of webbings (5) which are adjustable and able to be fastened on the tower is arranged underneath the collars (4). Then, the telescopic structure (3) is attached in the vertical position to the tower (1), and the lower segment of the telescopic structure (3) is fastened, by means of webbings (5) and adjustable tension rods (6). Then the unfolding or lifting of the telescopic structure (3) is performed as shown in FIG. 1 d, connecting each unfolding segment (3') of the telescopic structure (3) to a collar (4). The unfolding or lifting of the telescopic structure (3) continues until it reaches the tower head or nacelle (7).

Once the desired height has been reached, the component to be replaced is then lowered.

Figure 1D:
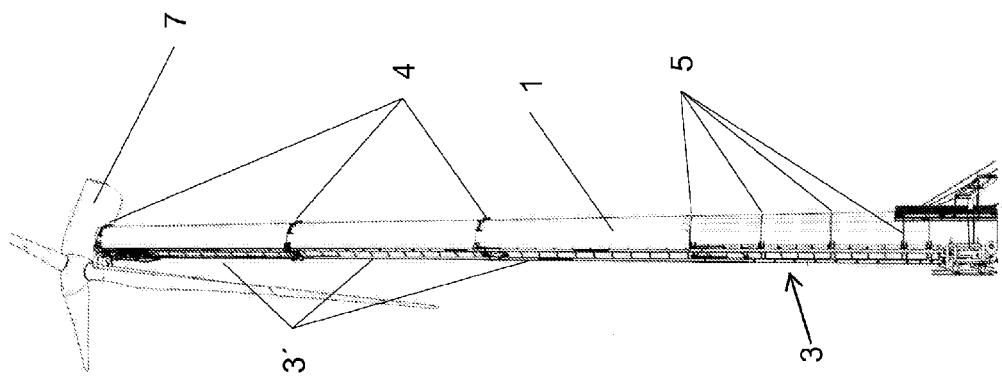
Figure 5A:
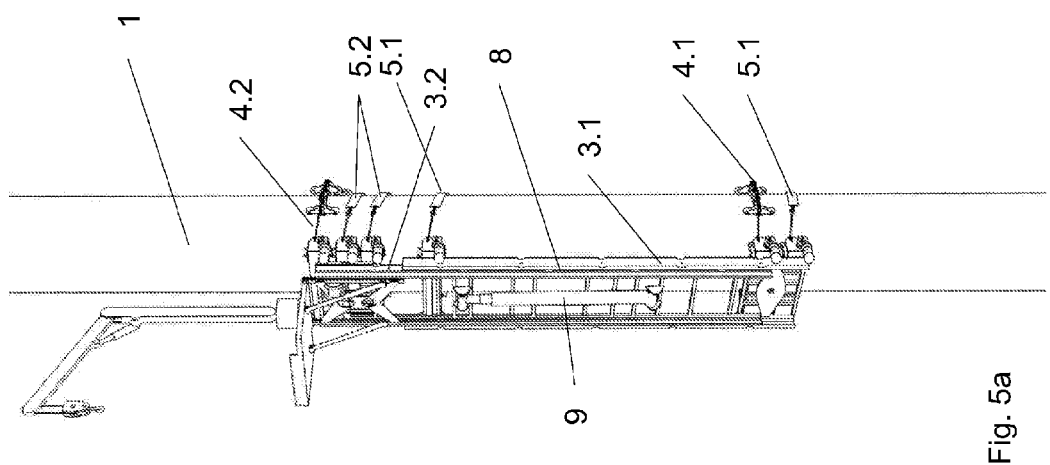
FIGS. 5a and 5b show, in the folded and unfolded positions, a preferred embodiment of the telescopic structure, made up of two segments, which is fastened on the tower of a wind turbine.
Figure 5B:
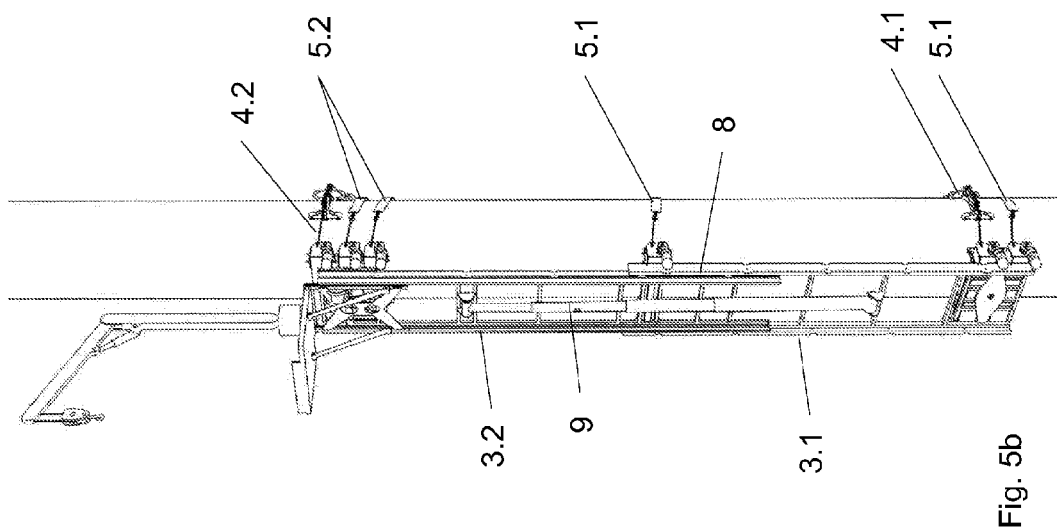

The telescopic structure (3) can be made up of only two segments which climb, see FIGS. 5a and 5b, or by a number of segments sufficient to reach the tower head (7) from resting on the ground, FIG. 1d, by means of the unfolding thereof.

In the embodiment of FIG. 5, the telescopic structure (3) is made up of two segments, a lower one (3.1) and another upper one (3.2), mounted on each other through longitudinal guides (8) and connected by means of a linear actuator (9), for example made up of a hydraulic cylinder. The lower segment (3.1) carries a collar (4.1) fastened on the lower end thereof and it is fastened to the tower (1) by means of one or more webbings (5.1). Moreover, the upper segment (3.2) carries a collar (4.2) fastened on the upper end thereof and it is connected to the tower by means of one or more webbings (5.2).

The collars (4) include an autonomous tension rod by means of which the outline of the collar is fitted to the tower, and a series of carts equipped with means for rolling on the surface of the tower.

Figure 2:
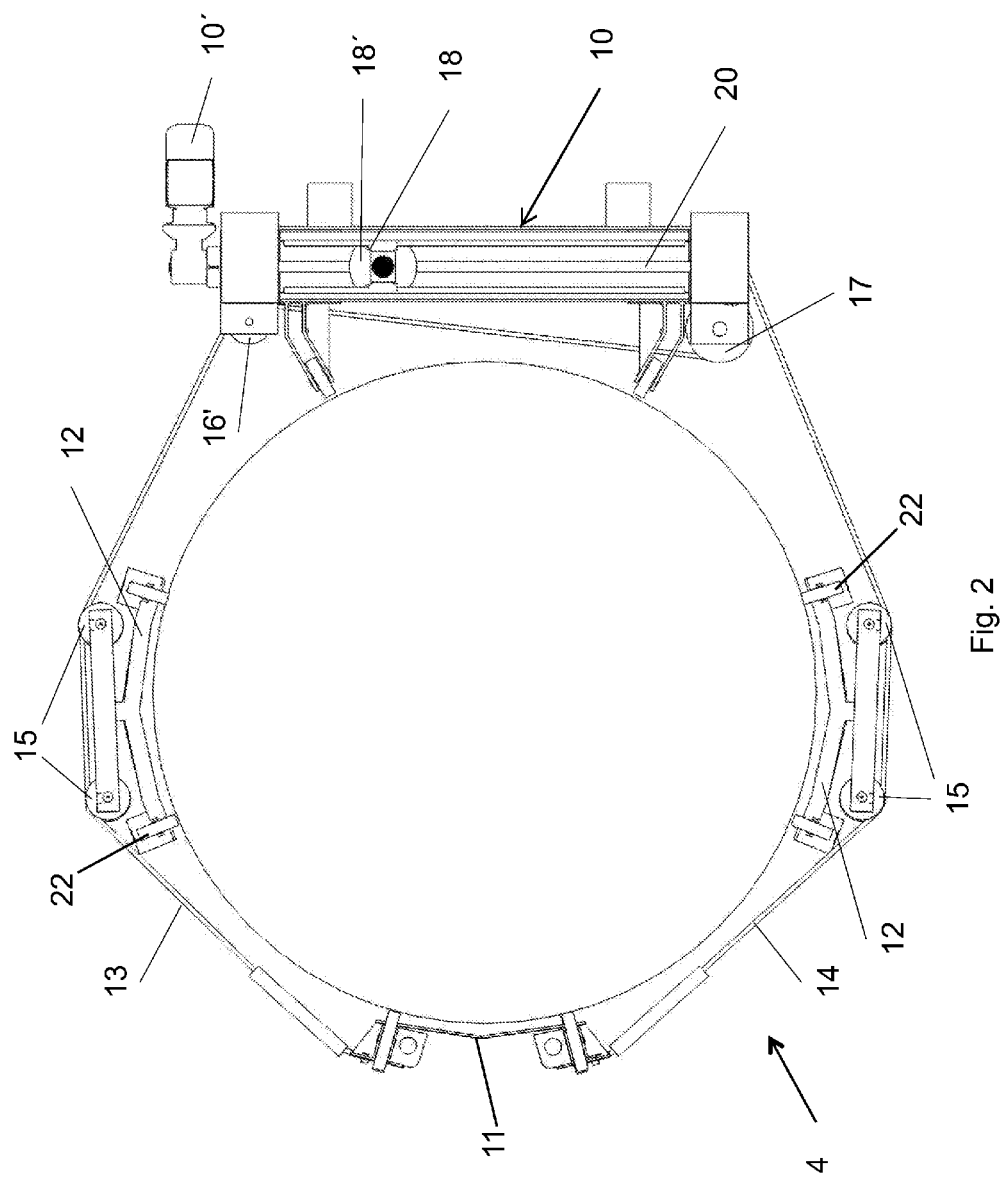
FIG. 2 is a plan view of a collar, which becomes a part of the equipment of the invention.
Figure 3:
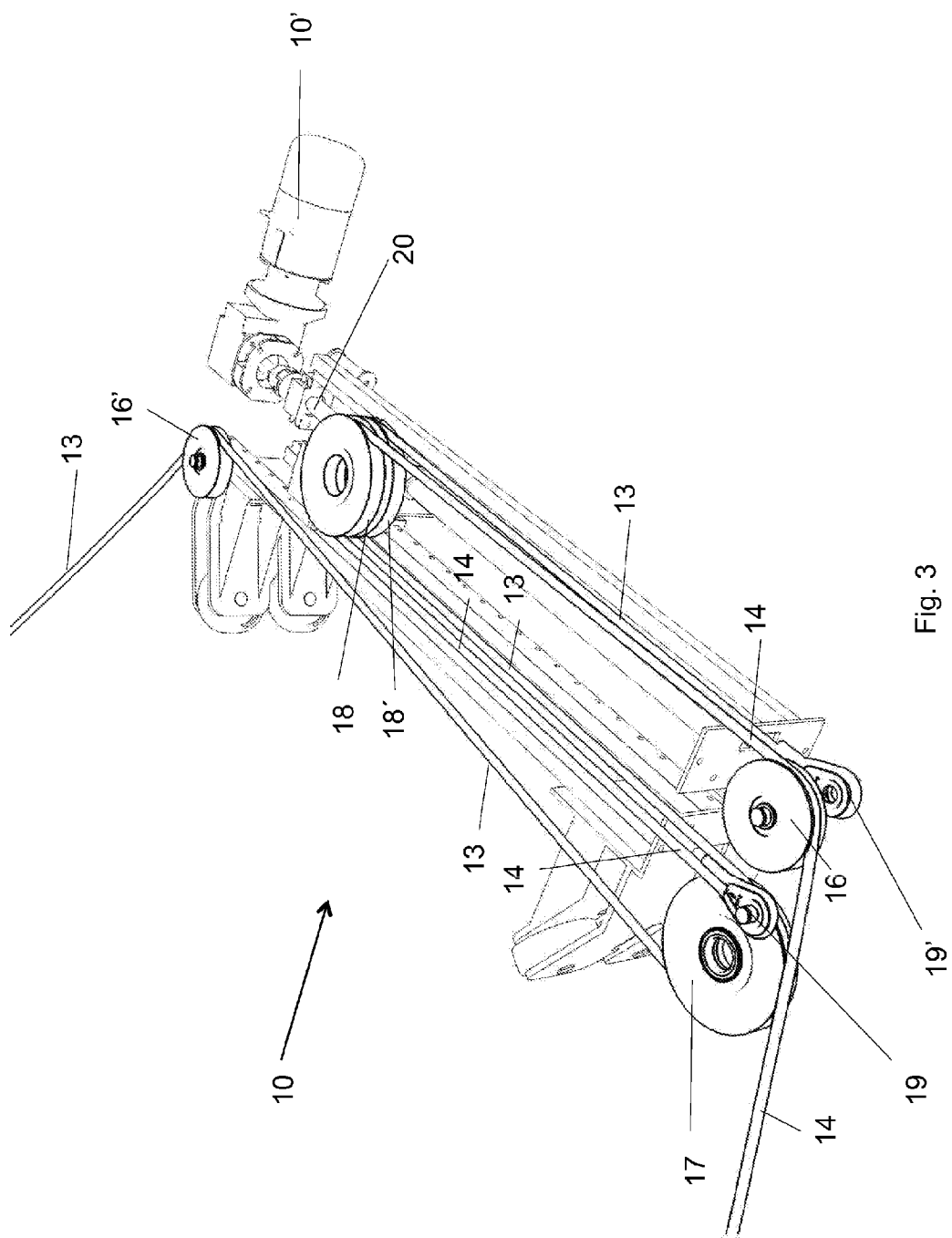
FIG. 3 shows a perspective view in cross section of the autonomous tension rod of FIG. 2.

FIG. 2 shows a possible embodiment of a collar (4), which is made up of an autonomous tension rod (10) and three identical carts, a central one (11) and two end ones (12), all of them horizontally connected to each other through cables (13) and (14). As shown in FIG. 2, the cable (13) is connected on one end to the cart (11) and passes over the vertical shaft sheaves (15) and one of the carts (12), on a first pulley (16') in a fixed position, on a second pulley (17) also in a fixed position which redirects the cable to a mobile pulley (18'), which is connected to a spindle (20) of the autonomous tension rod (10) in order to finally find the fixed point (19'), see FIG. 3, by means of the rotation of the spindle (20) in one direction or the other, actuated by a motor (10'); the linear movement of the pulley (18) is also achieved, tensing or loosening the cable (14) and, at the same time, pulling or releasing the pulley (18') which is likewise joined to the spindle (20) of the autonomous tension rod (10) in a parallel plane and sharing a shaft with the pulley (18), which will tense or loosen the cable (14), which will pass over the pulley (16) to the sheaves (15) of the opposite cart (12) and is fastened on one end to the cart (11) and on the other end to the fixed point (19) in the autonomous tension rod (10). In this manner, a collar (4) with double symmetric pulling is arranged, with which a perfect fit on the tower is obtained, at any height thereof.

Figure 4:
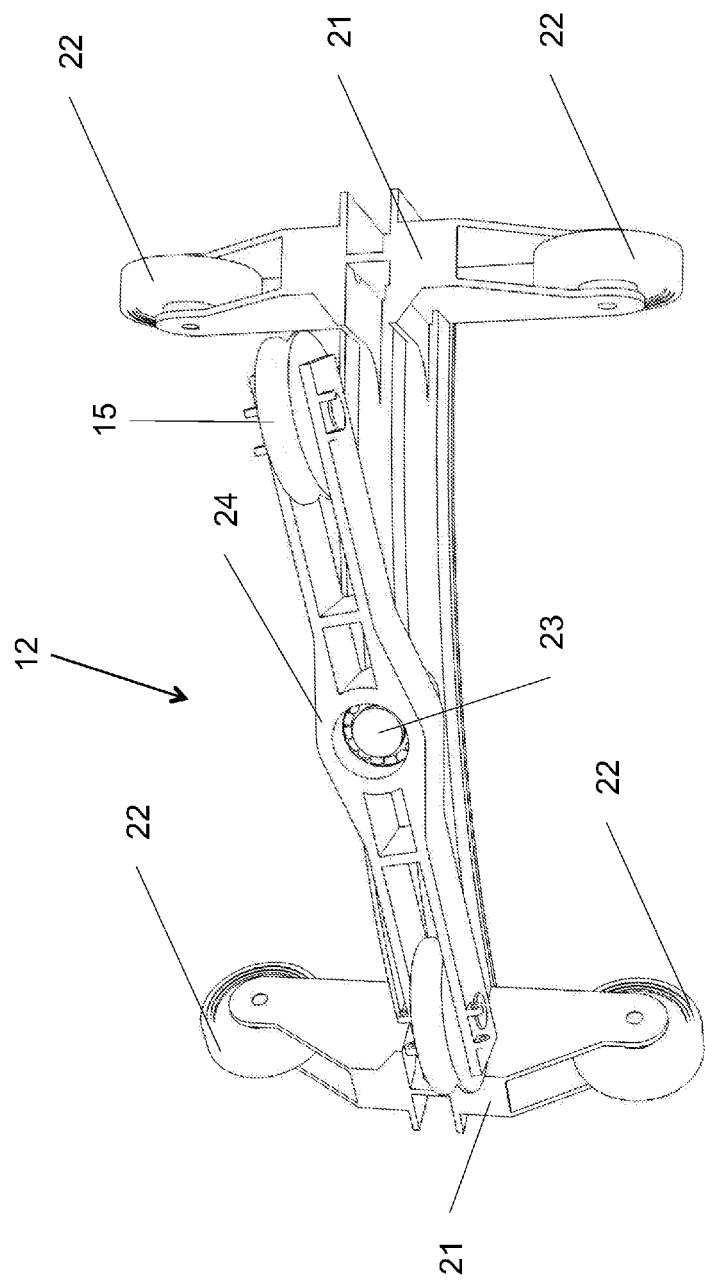
FIG. 4 is a perspective view of one of the carts which become part of the collar of FIG. 2.

The carts (12), as shown in FIG. 4, comprise a frame (21) wherein four horizontal shaft wheels (22) are mounted which make up the elements for rolling on the tower. Further mounted in the frame, by means of a horizontal rotation shaft (23), are a rocker arm (24) which is a carrier for the vertical shaft sheaves (15), whereon the cables (13 and 14) will pass. The cart (11) does not have a rocker arm.

In the case of the preferred embodiment with only two segments, once it has been installed vertically on the tower as shown in FIG. 5a, the climbing manoeuvre is started. To do so, the collars (4.1 and 4.2) must be sufficiently tensed in order to ensure good contact with the structure on the tower, an effect achieved by means of actuating the spindle (20) of the linear actuator (10) as described previously. Then, the webbing (5.1) is tensed such that the segment (3.1) is integrally joined to the tower. With the webbing (5.2) of the loosened segment (3.2), the extension of the linear actuator (9) is then performed, which, since the segment (3.1) is fastened to the tower, will push the segment (3.2) upwards which will move in an ascending direction on the tower, without coming off of it thanks to the support through the collar (4.2). When this point is reached, see FIG. 5b, the webbing (5.2) is then tensed and the webbing (5.1) loosened. The structure stays suspended from the webbing (5.2) of the segment (3.2) and the linear actuator is activated again, retracting it to the minimum position thereof, producing the raising of the segment (3.1). It continues in the described manner, repeating both steps, reaching the upper portion of the tower, and in the opposite direction in order to lower the telescopic structure. The tensing and loosening of the webbings is carried out by autonomous tension rods (10), such as for example the one described in FIG. 3, adapting the pulleys to the cross section of the webbing.

As a possible variant, the telescopic structure can be made up of the number of segments (3') necessary by means of the unfolding or raising of which the upper portion of the tower is reached resting on the ground at all times, as seen in FIG. 1d.

Figure 6:
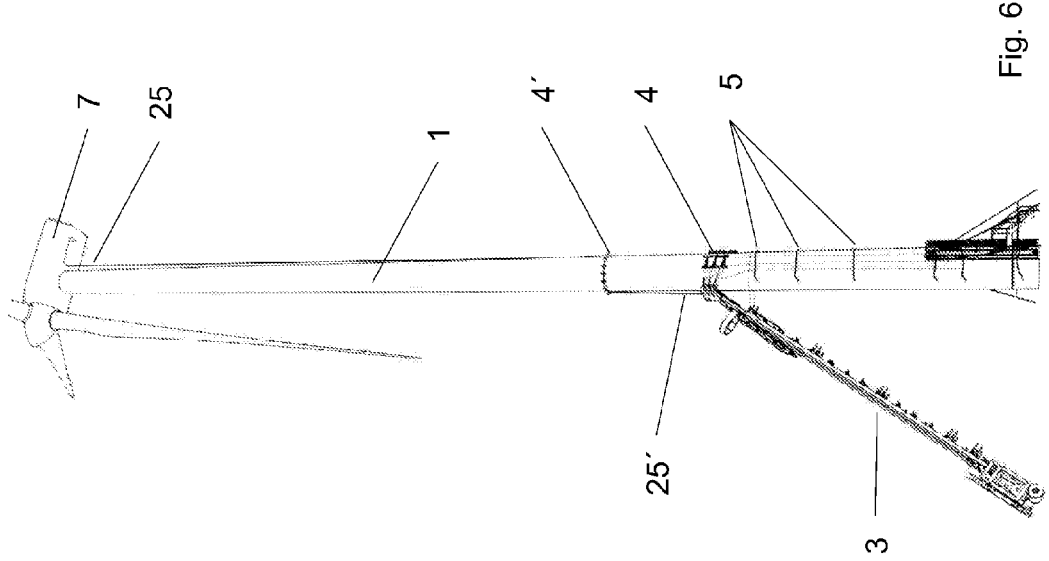
FIGS. 6 and 7 are schematic representations of two modes of installation of the telescopic structure.
Figure 7:
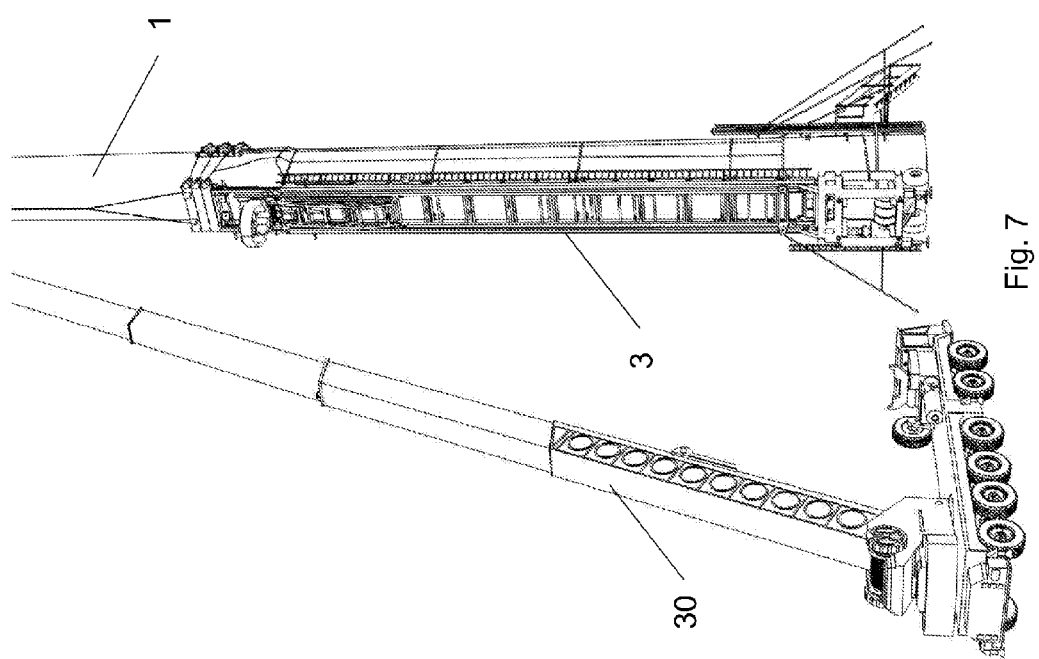

Both in the two-segment variant and in the one resting on the ground, the installation of the telescopic structure (3) can be carried out as shown in FIG. 6, by means of an auxiliary collar (4') hoisted from the ground to the head (7) by means of a cable (25), wherein the length thereof would be reduced and it would be allowed to lower until it is placed at the desired height, taking advantage of the conical shape of the tower, by means of adapting the length of the collar to the length of the tower perimeter in the cross section wherein the collar (4') is to be fastened, and from which in turn, by means of the cable (25') the telescopic structure (3) is suspended for the installation thereof. The installation can also be carried out with an auxiliary crane (30), as shown in FIG. 7.

Figure 8:
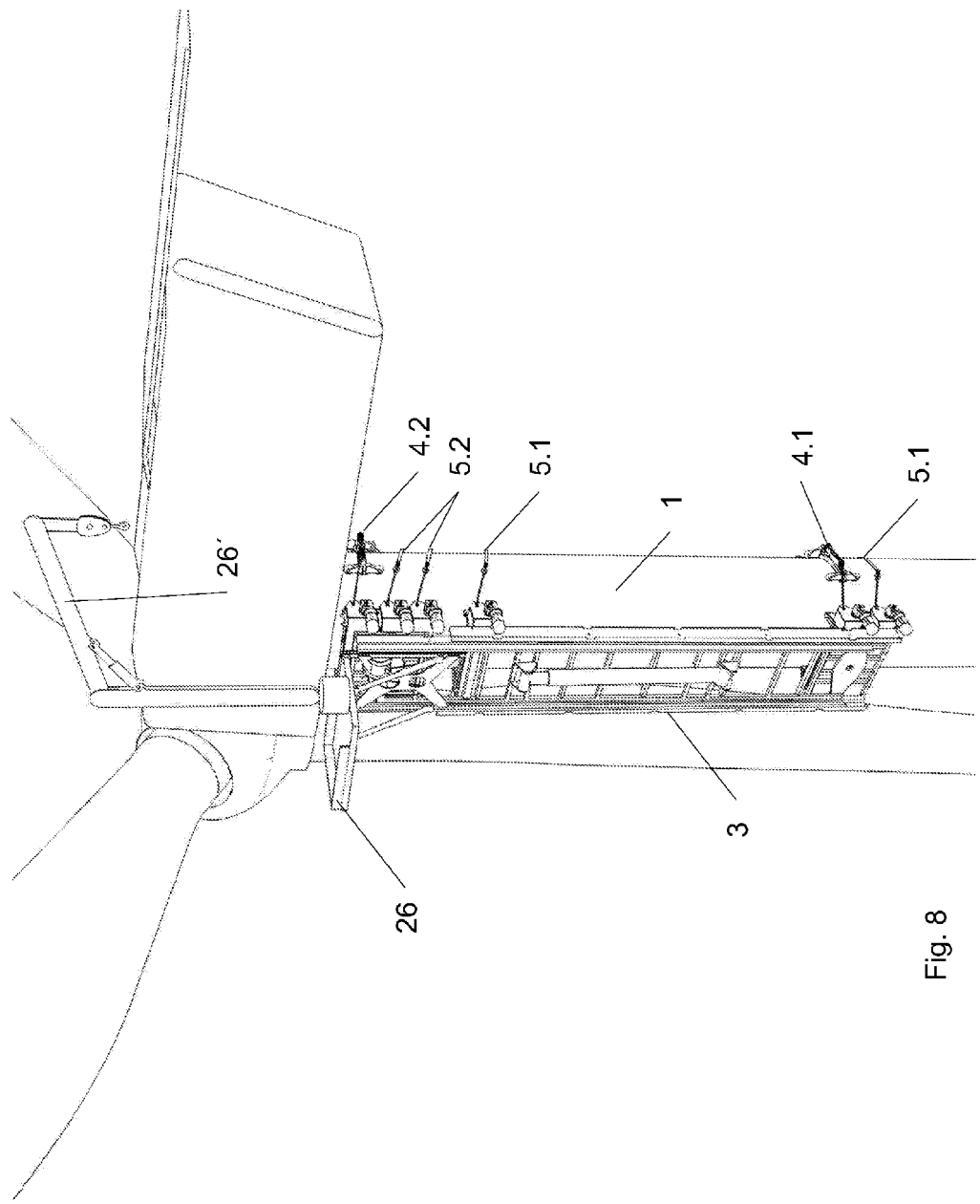
FIG. 8 is a diagram representing the equipment for replacing components housed in the tower head in the preferred embodiment of two segments.

When trying to replace components housed in the tower head (7), the upper segment of the telescopic structure (3) is a carrier on the upper end thereof, FIG. 8, of a platform (26) and a crane (26') for lowering and raising the components, whatever the arrangement of said telescopic structure is.

Figure 9:
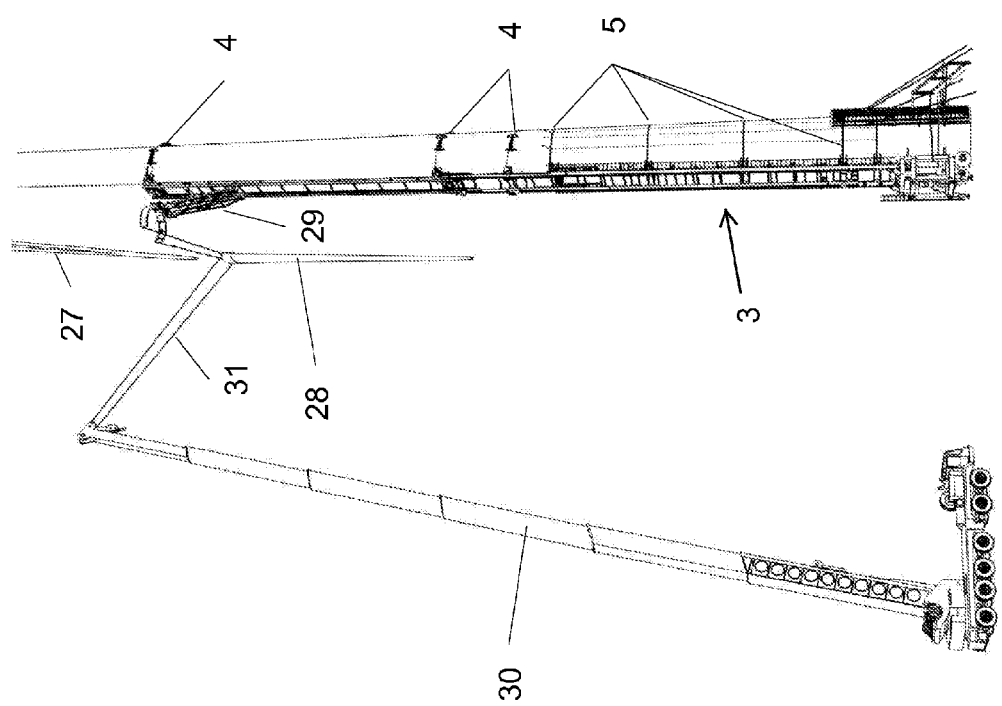
FIGS. 9 to 14 show successive steps and units of equipment for the process of replacing a blade of the wind turbine.
Figure 10:
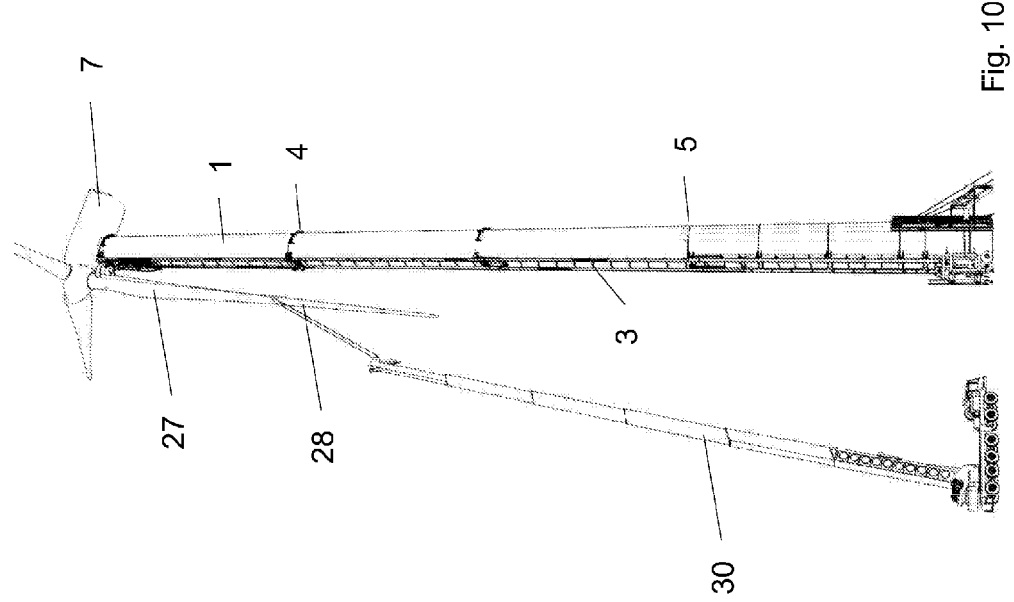
Figure 11:
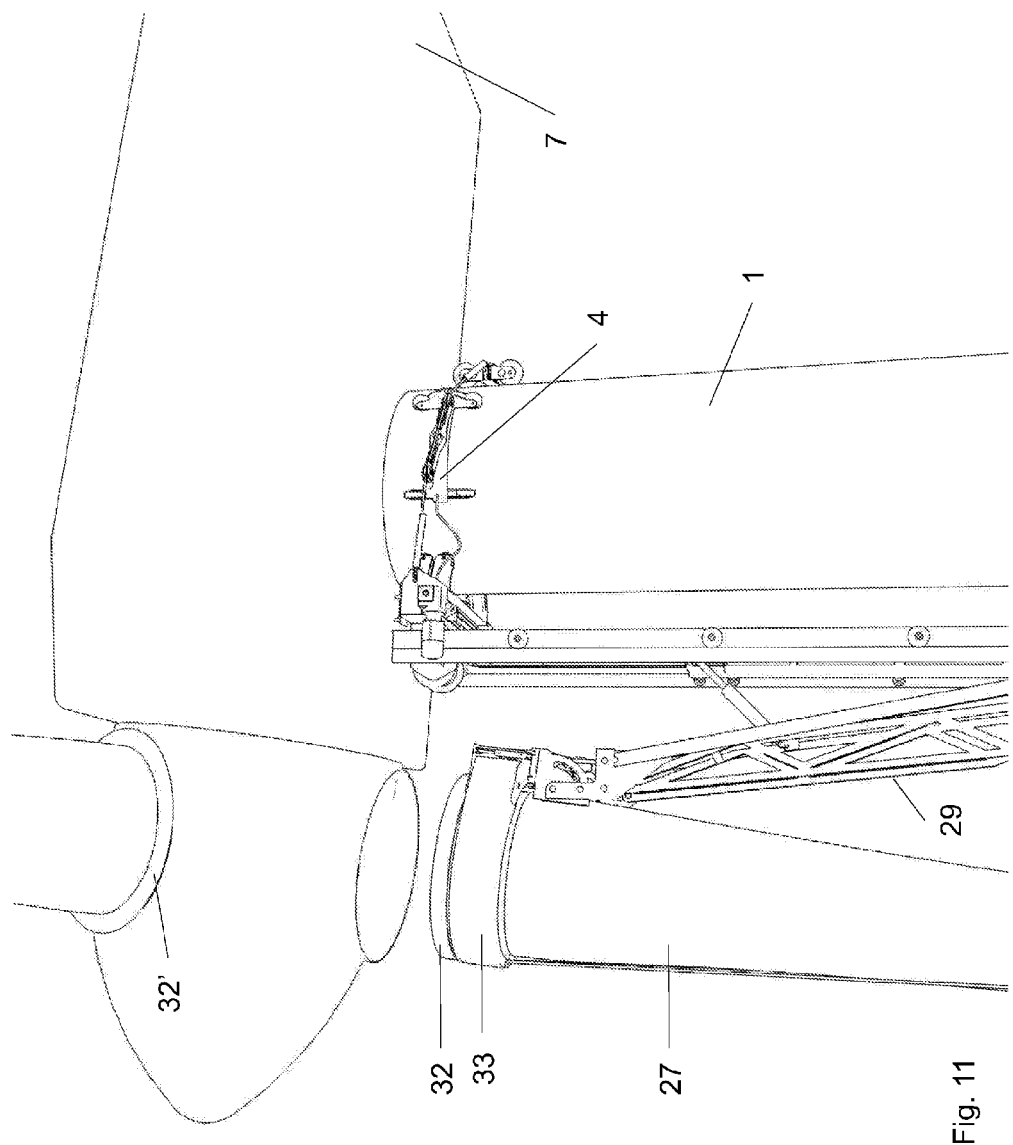
Figure 12:
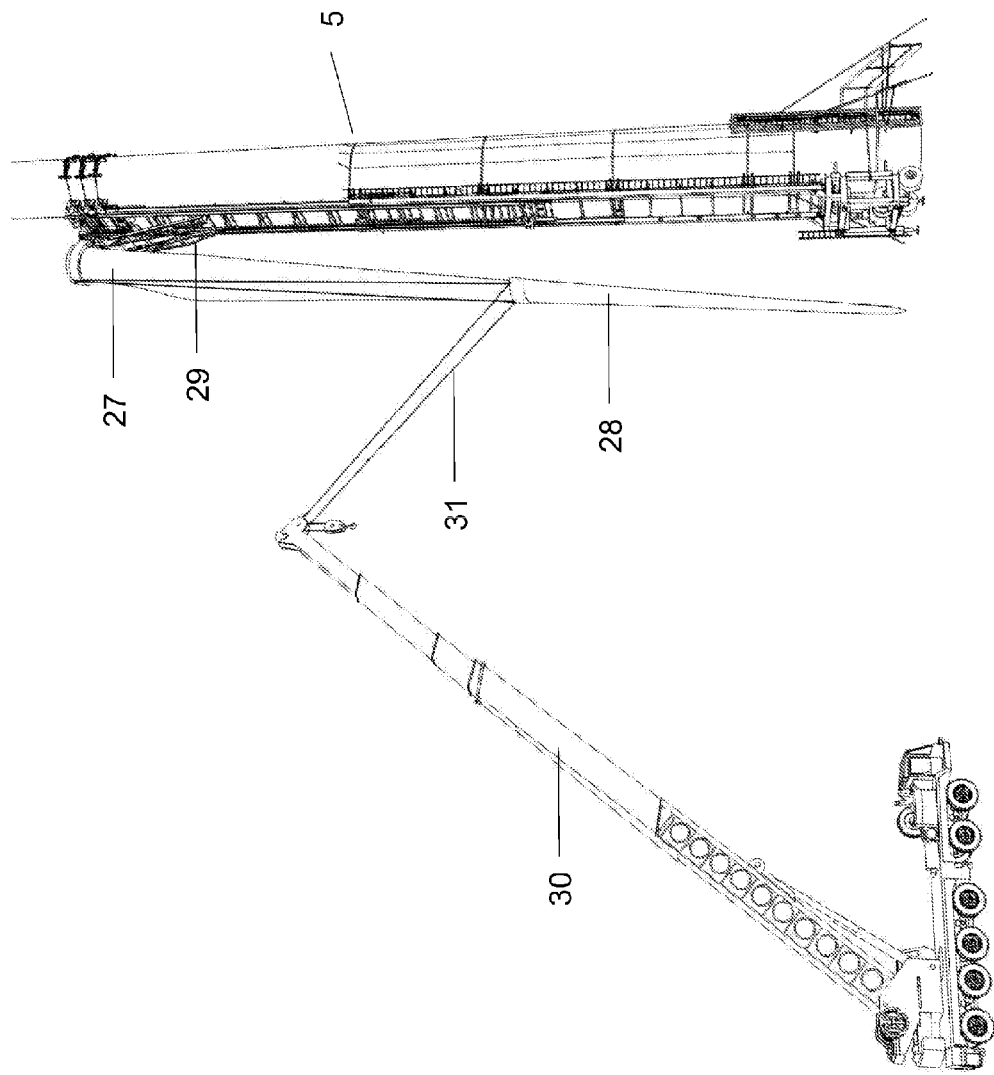
Figure 13:
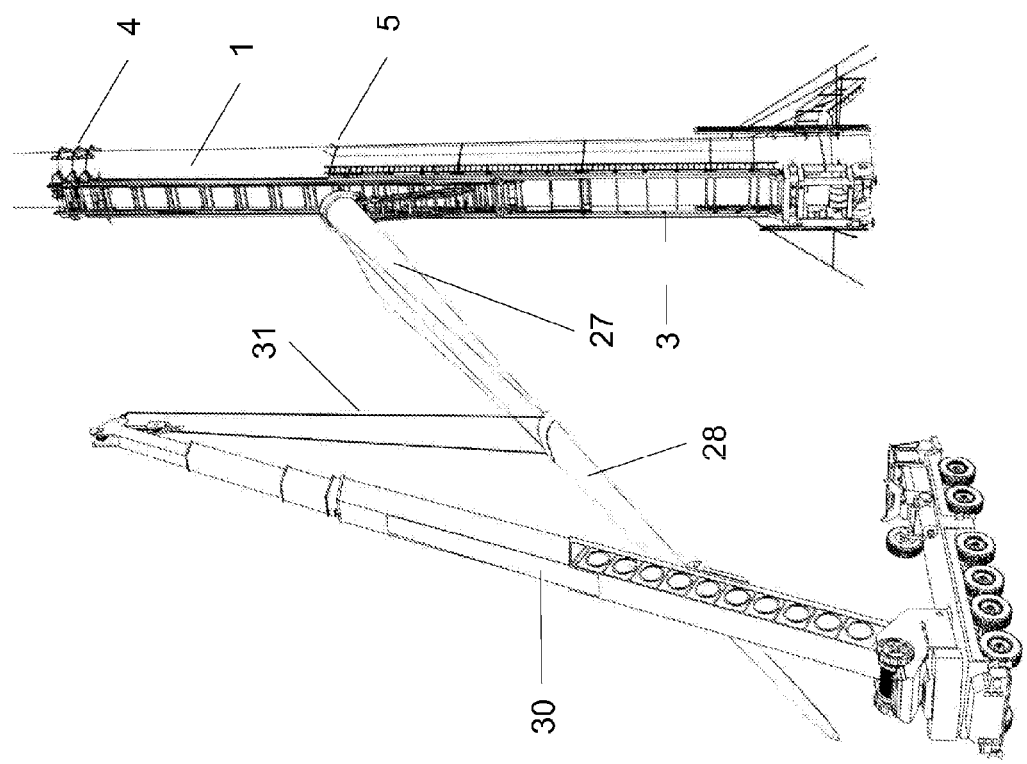
Figure 14:
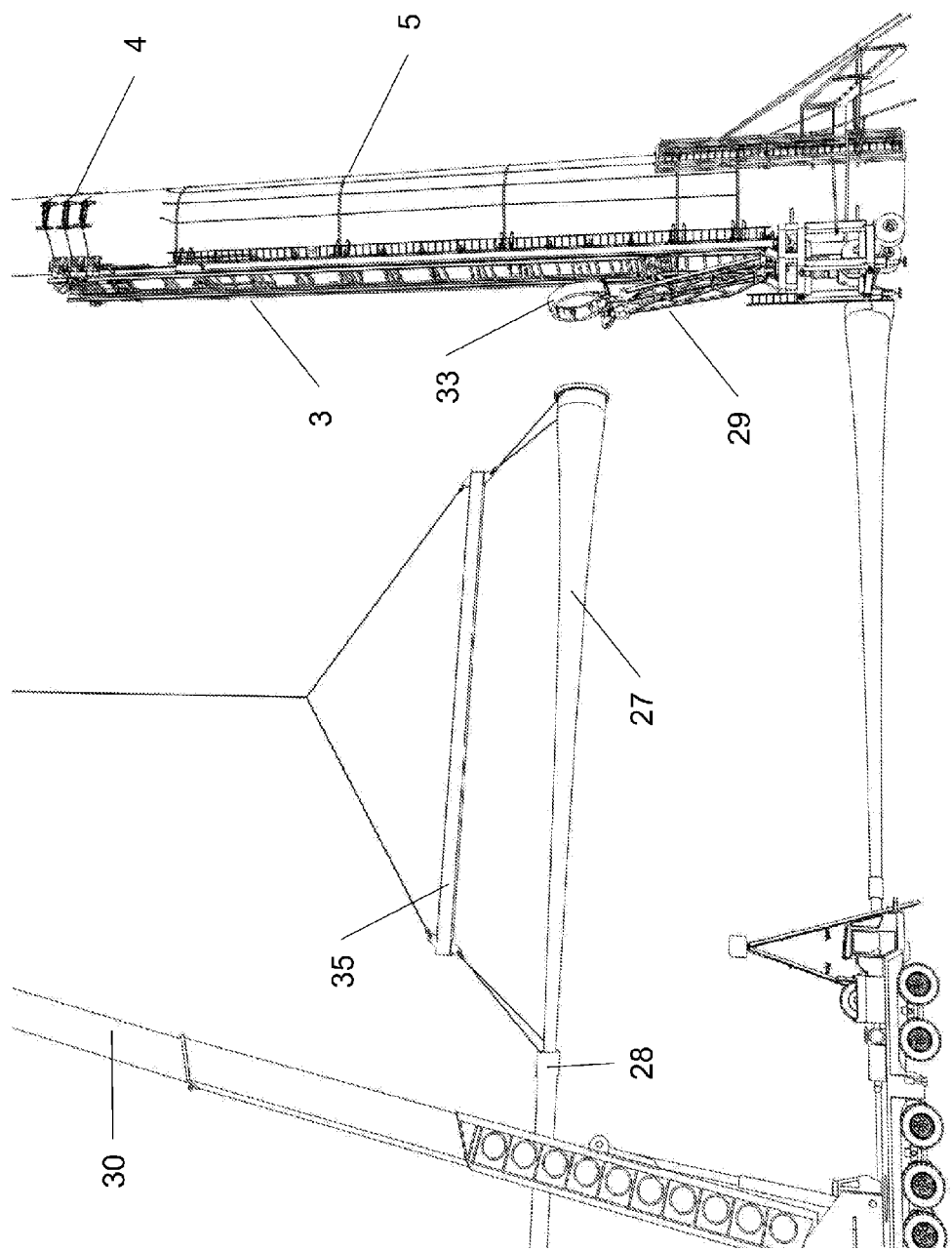

When trying to replace a wind turbine blade, the process to be followed is as follows:

The wind turbine with the blade (27) to be replaced is arranged, in the vertical position, with the tip pointing upwards and the dust cover (32') situated between the blade and the casing of the hub is then disassembled and a first group of nuts securing the bearing to the hub is released, a second group of nuts not being extracted, in a sufficient number to support the rotation of the wind turbine 180 degrees, such that the blade to be replaced (27) stays in the vertical position, with the tip pointing downwards, FIG. 9. Then a cover (28) is coupled onto the blade (27) starting from the tip, for example, by suspending said cover from a frame (29) mounted on the telescopic structure, and a crane (30) and pulling with two cables (31). Then by means of raising the telescopic structure, the cover (28) is coupled onto the blade (27), as shown in FIG. 10. Once the seal (28) is coupled, the root of the blade (27) is clasped underneath the bearing (32) by means of a gripper (33), FIG. 11, mounted and supported through the frame (29) mounted on the upper segment of the telescopic structure (3). Then the lowering of the blade (27) is started, once the second group of nuts which secured the blade to the hub is removed, by means of the retraction of the telescopic structure (3), FIG. 12, at the same time as it is pulled horizontally from the cables (31), causing the progressive flipping of the blade (27), FIG. 13, until it reaches a horizontal position, FIG. 14, wherein the blade is suspended from a rocker arm (35) from which, once the cover (28) and gripper (33) have been removed, it can be mounted on a transportation platform.

For the assembly of the new blade it is performed in the reverse order from the one described.

Figure 15:
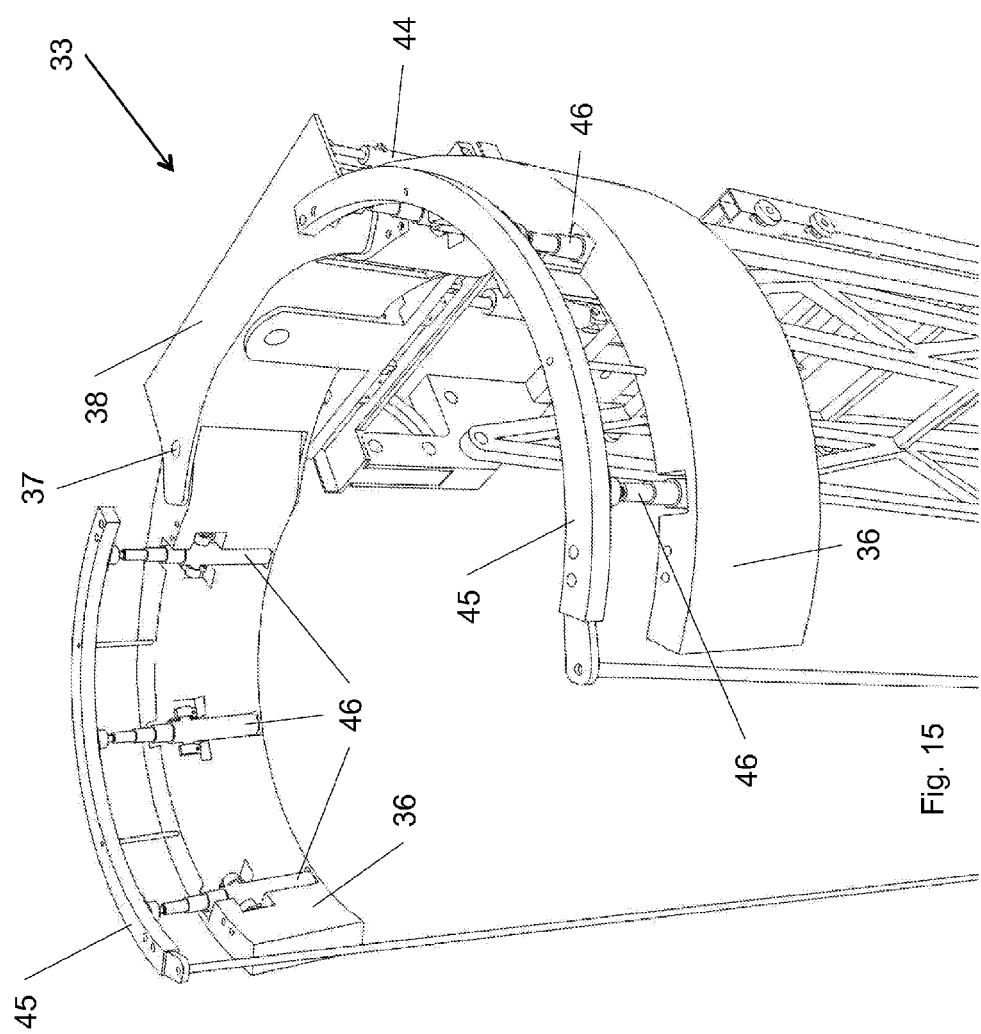
FIG. 15 is a perspective view of the gripper used in the process of replacing a blade.
Figure 16:
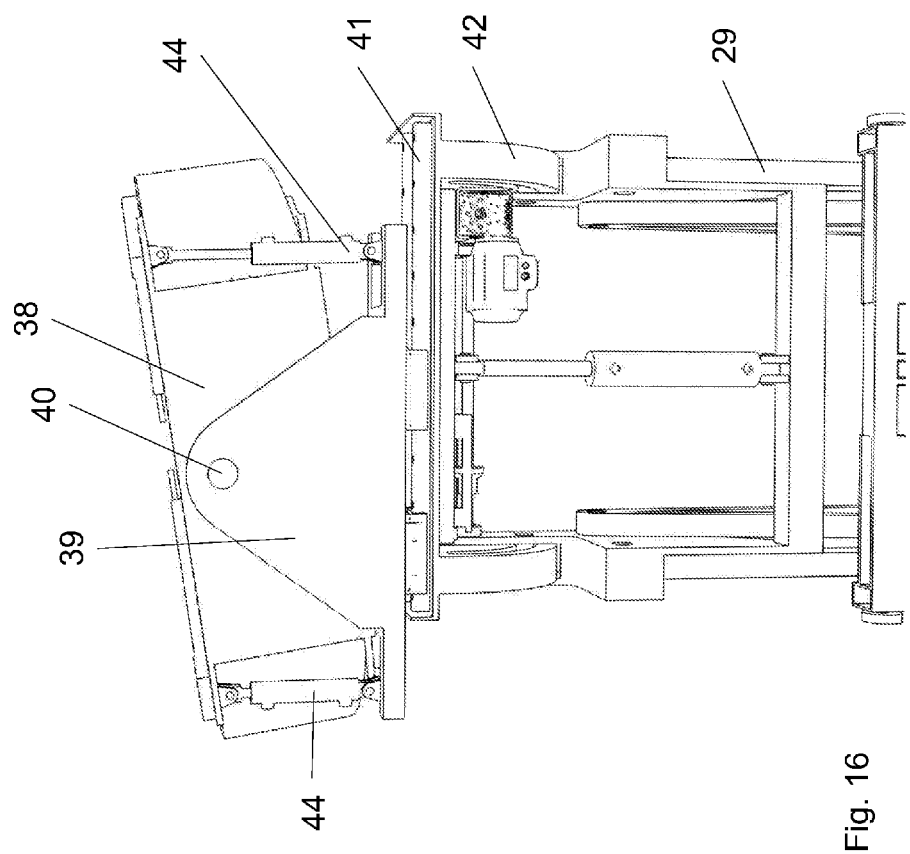
FIG. 16 is a rear elevation view of the gripper of FIG. 15.

As seen in FIG. 15, the gripper (33) is made up of two coplanar arched arms (36), facing each other on the concave side and articulated on one end, by means of vertical shafts (37), on a first support (38) which is in turn mounted on the upper segment of the telescopic structure, through a fitting system.

Figure 17:
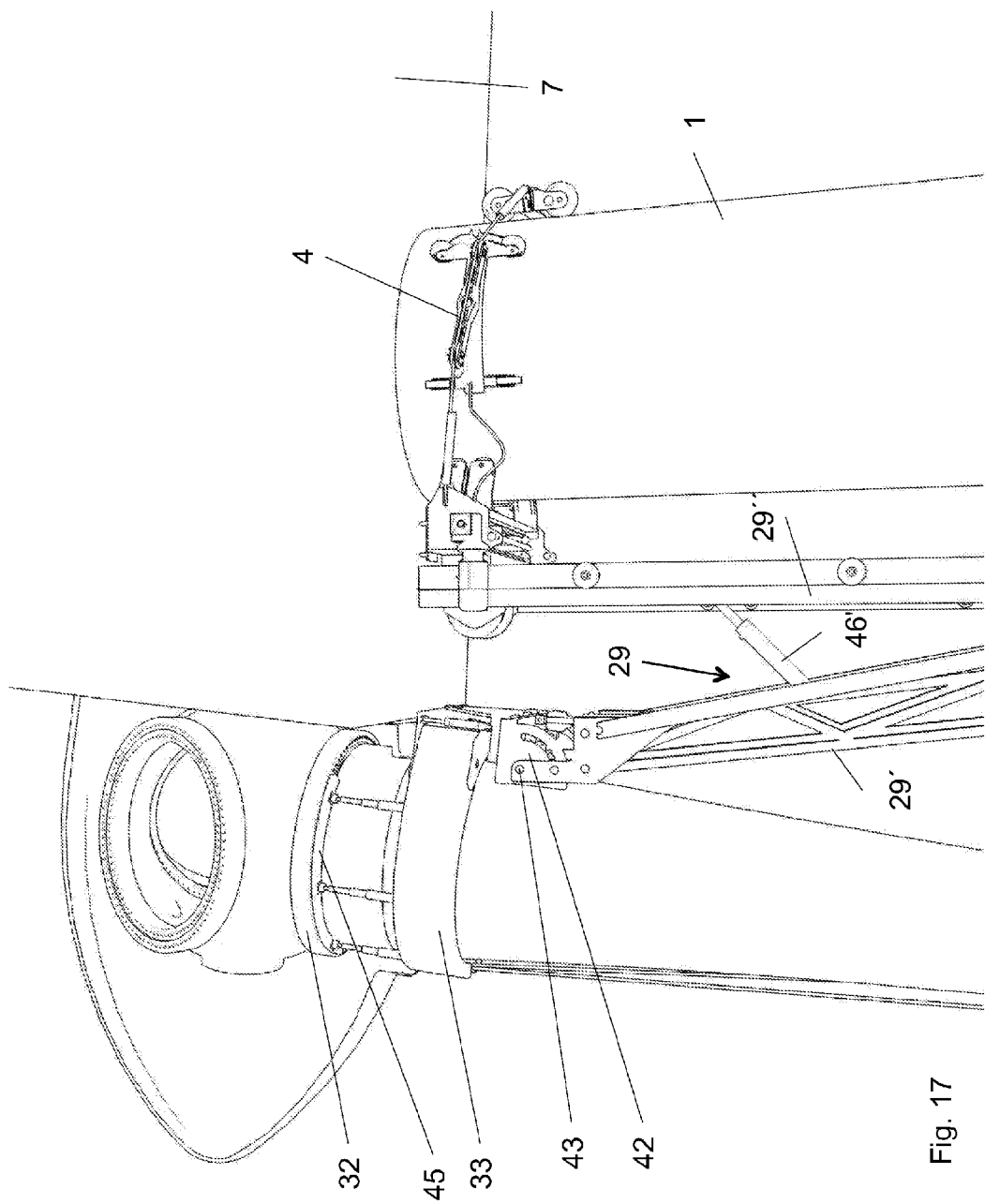
FIG. 17 is a side elevation view of the compass through which the gripper is mounted on the upper segment of the telescopic structure.
Figure 18:
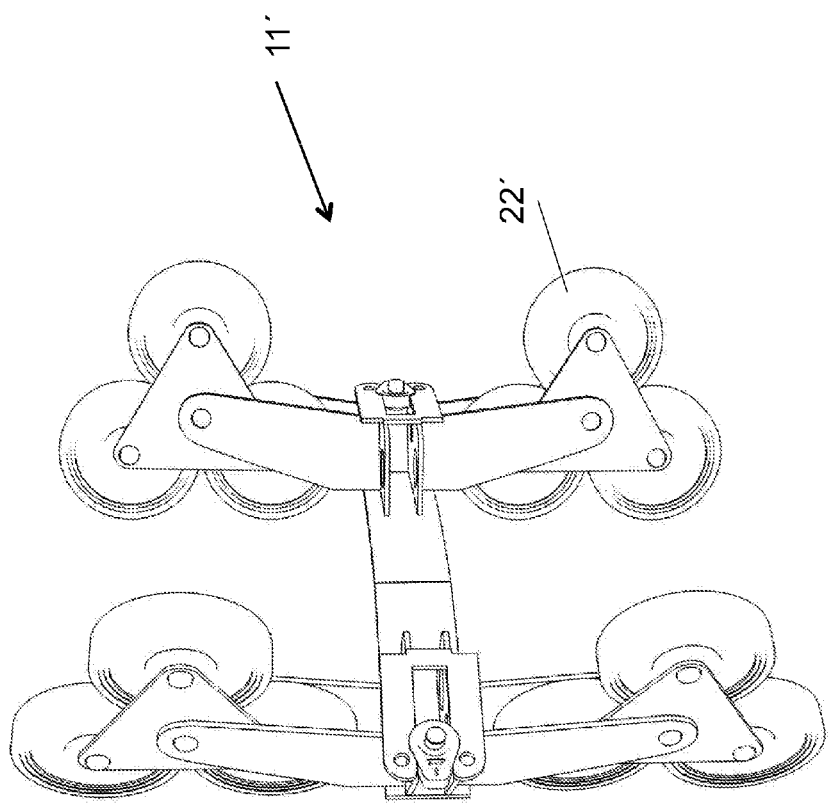
FIG. 18 shows a perspective view of a possible arrangement of the carts which become part of the collars, intended to save possible stairs on the external surface of the tower.
Figure 19:
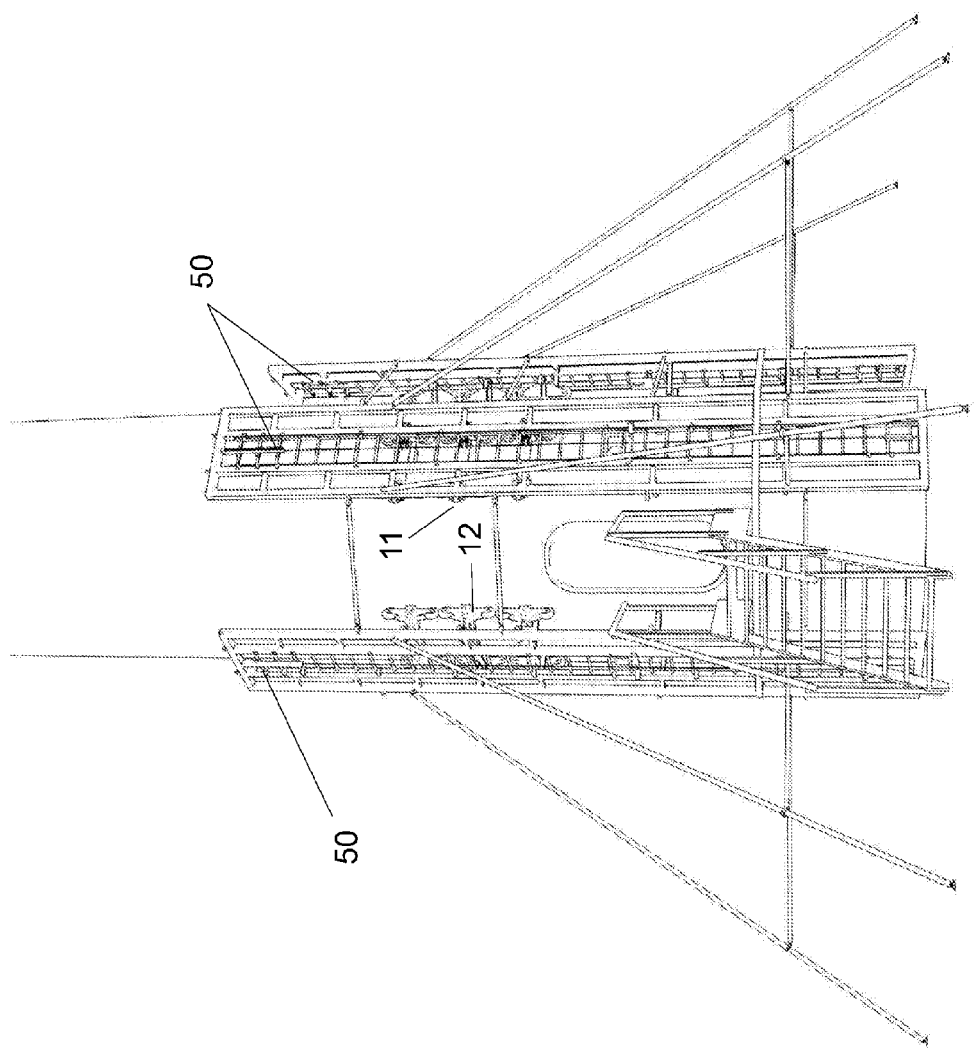
FIG. 19 shows a perspective view of possible columns with a matrix structure (50) used for the assembly of the carts of the collars, there also being the possibility of hanging the carts from the auxiliary collar of FIG. 6 or from columns with hoists placed on the upper portion, wherefrom the carts would be suspended.
Figure 20:
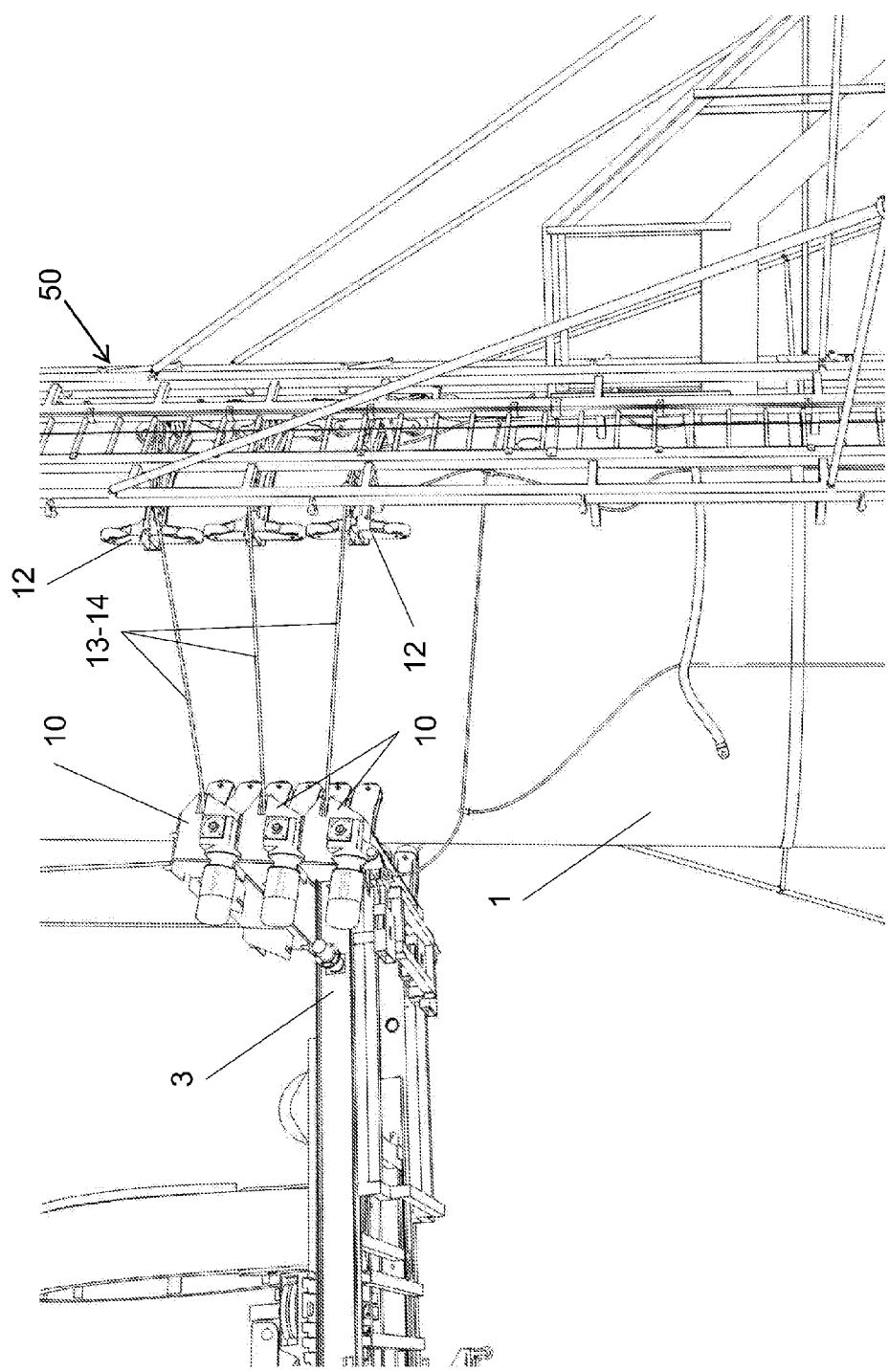
FIG. 20 shows a perspective view of the positioning and assembly of the collar components.

The mentioned fitting system comprises a base (39) whereon the first support (38) is mounted through a horizontal rotation shaft (40). In turn, the base (39) is mounted through guides or rails (41) perpendicular to the horizontal rotation shaft (40), on a second support (42) which, as shown in FIG. 17, is articulated to the frame (29) through a tilting shaft (43), parallel to the guides or rails (41). The set of arched arms (36) and first support (38) are further connected to the base (39) through two actuation cylinders (44).

As seen in FIG. 15, the arched arms (36) are carriers for supports (45) having an adjustable height, supported for example by cylinders (46).

The frame (29) also becomes part of the fitting system, which is made up of two arms (29' and 29") articulated on the lower end thereof and connected by an actuation cylinder (46), in order to enable, by means of the opening and closing thereof, the horizontal movement of the gripper (33). Furthermore, the frame (29) is movable along the upper segment of the telescopic structure.

In this manner and thanks to the possibility of positioning the arms (36) of the gripper (33), perfect coupling of said gripper on the root of the blade can be achieved, in order to carry out the assembly and disassembly thereof.

Figure 21:
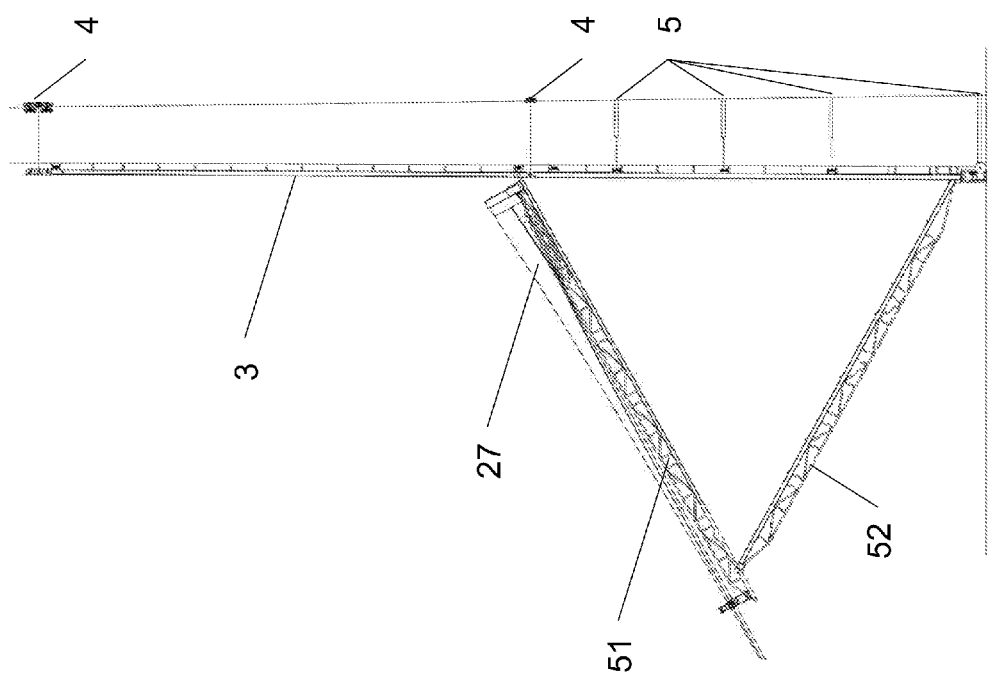
FIGS. 21 and 22 show a side elevation view of a possible scissor-like embodiment of the raising and lowering means for the wind turbine components.
Figure 22:
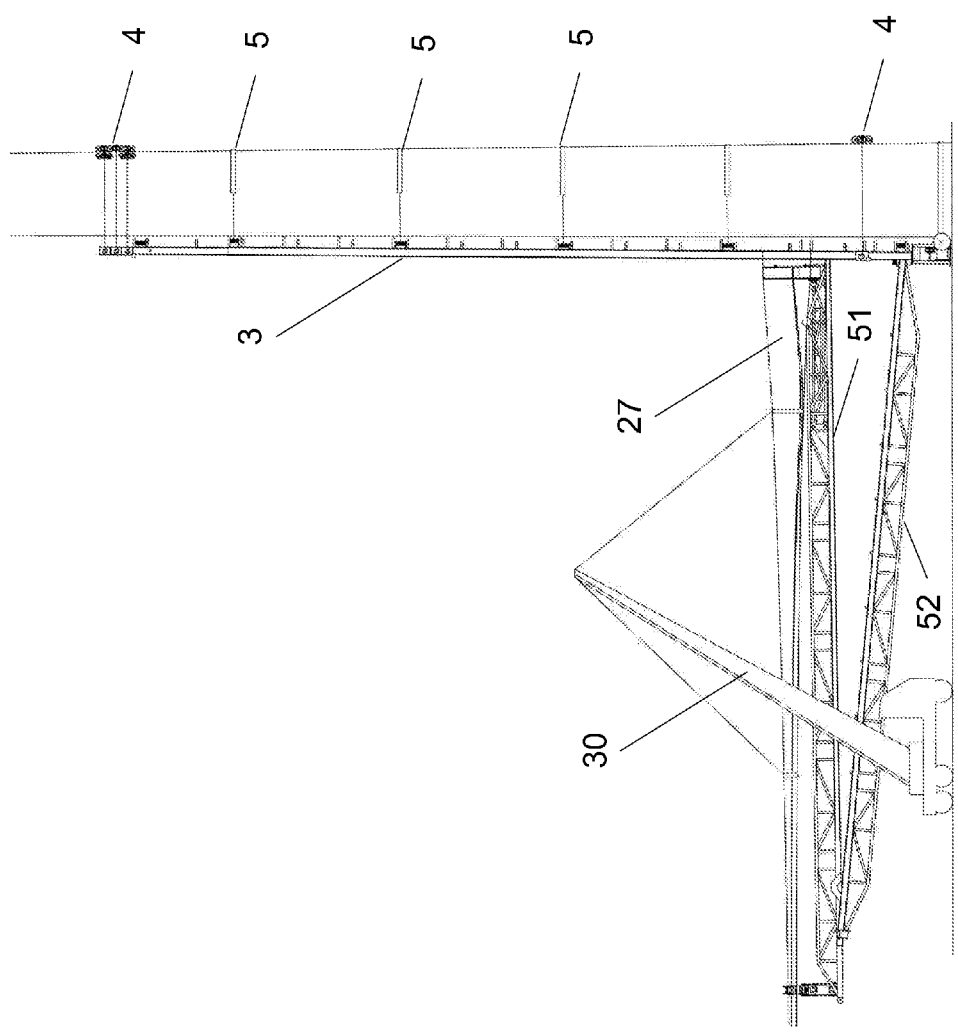
Figure 23:
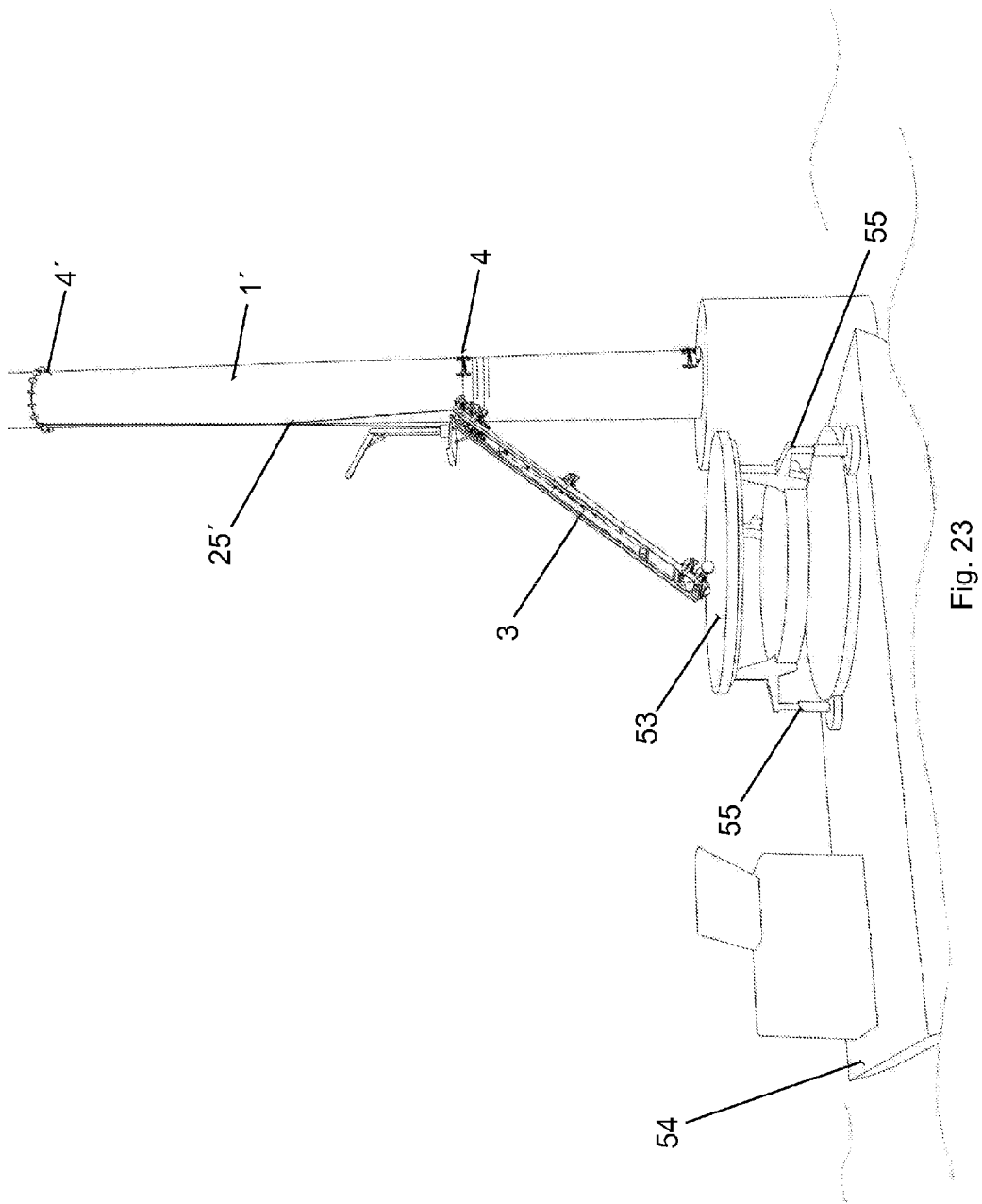
FIG. 23 shows a perspective view of a possible arrangement for the assembly of the telescopic structure for wind turbines installed on the seabed.

According to a possible embodiment, the two upper segments (51 and 52) of the telescopic structure, FIGS. 21 and 22, have on the adjacent ends thereof means which enable an articulated connection between them. These means can consist of lugs on both segments, attachable to each other and each being equipped with a hole, each pair of lugs able to face each other for the passage of a bolt or articulation shaft.

With this arrangement, the lowering of the blade (27) is started with the folding of the two upper segments (51 and 52), FIG. 21, of the telescopic structure and the scissor-like lowering of said segments, FIG. 22, through the telescopic structure (3), until it is close to the ground, wherein the blade (27) can be grabbed by the crane (30) in order to be loaded on a transportation platform.

When the replacement of components is performed in wind turbines (1') installed on the seabed, the telescopic structure (3) is mounted on a wave compensation platform (53) which is installed on a barge (54) through supports (55) which expand or contract in order to compensate for the movements caused by the waves, such that they enable said platform (53) to stay horizontal.

Figure 24:
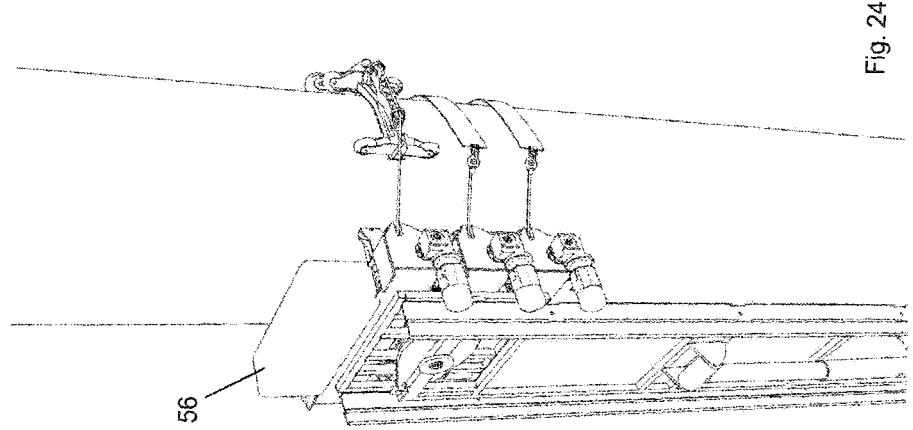
FIG. 24 shows the use of the telescopic structure as an energy accumulator.

In the case of using the telescopic structure (3) as an energy accumulator, see FIG. 24, a weight (58) would be incorporated therein which would help to increase the potential energy of the set when energy is to be accumulated during the raising of the set and that likewise would help to increase the kinetic energy thereof in the energy generating process during the lowering thereof.

The invention claimed is:

1. An equipment for replacing wind turbine components, designed to attach parallel to and on a minor sector of a tower having a head and a major sector, comprising:
   a telescopic structure made up of only two longitudinal segments comprising an upper longitudinal segment and a lower longitudinal segment, the telescopic structure having a retracted vertical position and an extended vertical position, wherein:
     the telescopic structure is adapted to be attached vertically, in the retracted vertical position, to the minor sector of the tower;
     the upper longitudinal segment and the lower longitudinal segment are mounted on each other through longitudinal guides and connected together by a linear actuator, such that said upper and lower longitudinal segments slide overlapping with each other causing alternating retraction and expansion of said telescopic structure to enable reaching the head of said tower by climbing in a number of iterations, wherein the upper longitudinal segment is extended upwards first and the lower longitudinal segment is pulled upwards thereafter in each of the number of iterations; and at least two webbings per longitudinal segment wherein one of the at least two webbings is located in an upper end of each longitudinal segment, and the other of the at least two webbings is located in the upper end or a lower end of each longitudinal segment, the webbings being adapted to surround the major sector of the tower and fasten the longitudinal segments of the telescopic structure to the tower.

2. The equipment according to claim 1, further comprising a crane mounted on an upper end of the telescopic structure.

3. The equipment according to claim 1, further comprising at least one horizontal collar wherein at least part of the at least one horizontal collar comprises a horizontal frame which is a carrier for horizontal shaft wheels and for an external rocker arm which is a carrier for a vertical shaft sheaves and is articulated to the frame through a central horizontal shaft, perpendicular to the horizontal shaft wheels.

4. The equipment according to claim 1, further comprising at least one horizontal collar arranged around the tower, hoisted from the tower head by means of a cord, the collar having a length adjustable to an outline of the tower for a fastening thereof on the same at a desired height taking advantage of a tapering of the tower, wherein the telescopic structure is suspended from the collar by means of a cable for a vertical positioning thereof together with the tower.

5. The equipment according to claim 1, further comprising a weight incorporated in one of the upper or lower longitudinal segments thereof configured to convert potential energy, accumulated during a raising of the upper and lower longitudinal segments, into electrical energy by lowering the upper or lower longitudinal segments when energy demand exceeds energy generated by the wind turbine.

6. The equipment according to claim 1, wherein for the replacement of a blade of the wind turbine, a means for securing and handling said blade comprises
 a cover, suspended from the telescopic structure, coupled to the blade,
 a gripper comprising two arched arms, coplanar and facing each other on a concave side, mounted on an upper portion of the telescopic structure, closing underneath a bearing of said blade to hold the weight of the blade and the bearing by laying a lower face of the bearing on an upper face of the two arched arms, the two arched arms comprising supports having an adjustable height for reaching the lower face of the bearing of the blade.

7. The equipment according to claim 6, wherein the supports having adjustable height comprises vertical actuation cylinders.

8. The equipment according to claim 6, further comprising a fitting system that comprises a base whereon a first support is mounted through a horizontal rotation shaft and actuation cylinders, the base of which is mounted through a rail perpendicular to the horizontal rotation shaft, on a second support which is articulated to a frame, through a tilting shaft parallel to the rail.

9. The equipment according to claim 8, wherein the fitting system further comprises a compass, through which the frame is connected to the upper longitudinal segment of the telescopic structure, the compass of which is movable along the height of said segment.

10. A method for replacing wind turbine components, using the equipment according to claim 1, the method comprising:
 a) moving a new component to be replaced and the telescopic structure made up of only two longitudinal segments closer to the tower;
 b) situating the telescopic structure parallel to the tower in the retracted vertical position and fastening the longitudinal segments of the telescopic structure to said tower by means of the at least two webbings per longitudinal segment surrounding the tower perimeter;
 c) lifting the telescopic structure, by the upper and lower longitudinal segments sliding overlappingly with each other causing alternating retraction and expansion of the telescopic structure wherein the upper longitudinal segment is extended upwards first and the lower longitudinal segment is pulled upwards thereafter in each of the number of iterations, and the at least two webbing per longitudinal segment fastening alternatingly the upper and lower segments allowing the telescopic structure to climb until reaching the head of the tower; and
 d) then proceeding to lower the wind turbine component to be replaced and raising the new wind turbine component.

11. The method according to claim 10, wherein the lifting of the telescopic structure is carried out by using an auxiliary collar that is fastened around the tower at a height greater than that of the telescopic structure in the collected position.

12. The method according to claim 10, wherein the raising of the telescopic structure is carried out with an auxiliary crane.

13. The method according to claim 10, wherein the replacement of components inside the nacelle of the wind turbine is carried out by means of a crane and platform mounted in the upper segment of the telescopic structure.

14. The method according to claim 10, further comprising placing around a base of the tower a series of collars which are horizontal, adjustable, able to be fastened and moved on the tower, each of the collars being connected to one of the only two longitudinal segments of the telescopic structure, wherein the fastening of the collars to the tower is carried out by fitting an outline of said collars on a surface of the tower, by means of an autonomous tension rod, which becomes part of said collars.

15. The method according to claim 14, wherein the collars comprises carts and a tension rod, connected to each other by means of cables, wherein the carts of which are fastened on columns arranged in the vertical position around the base of the tower, and the tension rod is fastened to one of the only two longitudinal segments of the telescopic structure, which are moved closer to the tower and are connected to the carts through the cables.

16. The method according to claim 10, wherein for the replacement of a blade of the wind turbine, the method further comprises:
 coupling on the blade, starting from a tip of the blade, a cover which is suspended from the upper segment of the raised telescopic structure and is fitted to the blade by pulling from the cover by means of said telescopic structure;

coupling on a root of the blade, underneath a bearing of said blade, a gripper which is fastened to the upper segment of the telescopic structure and is able to clasp in a fitted manner said blade creating a support for the bearing;

releasing the blade from a hub and lowering until resting through a bearing on the gripper;

moving the blade closer to the tower and proceeding to lower the blade suspended from the gripper, by means of retraction and/or lowering of the telescopic structure;

collapsing the blade from the position thereof until reaching a horizontal position, pulling horizontally from the tip of the blade, through the cover coupled onto said blade, at the same time as the vertical lowering of the root of the blade is caused;

suspending the blade from a horizontal rocker arm, hanging from an auxiliary crane at the same time as the cover is extracted and the root is released from the gripper; and moving the suspended blade until situated over a transportation platform, for the loading thereof onto said platform.

17. The method according to claim 16, wherein in order to release the blade from the hub a dust cover and a first group of nuts securing the bearing are initially extracted, with the blade in the vertical position, with the tip pointing upwards, a second group of nuts not being extracted, in a sufficient number to support the rotation of the blade 180°, until situated in the vertical position with the tip pointing downwards, then resting the blade on the gripper, through the bearing, and proceeding to extract the second group of nuts.

18. The method according to claim 17, wherein the bearing of the blade rests on the gripper through supports having an adjustable height mounted in the gripper.

* * * * *